United States Patent
Sterling et al.

(10) Patent No.: US 11,980,790 B2
(45) Date of Patent: May 14, 2024

(54) AUTOMATED GAIT EVALUATION FOR RETRAINING OF RUNNING FORM USING MACHINE LEARNING AND DIGITAL VIDEO DATA

(71) Applicant: Agile Human Performance, Inc., Baldwinsville, NY (US)

(72) Inventors: Nicholas William Sterling, Atlanta, GA (US); Karl Van Sterling, Baldwinsville, NY (US)

(73) Assignee: Agile Human Performance, Inc., Baldwinsville, NY (US)

( * ) Notice: Subject to any disclaimer, the term of this patent is extended or adjusted under 35 U.S.C. 154(b) by 658 days.

(21) Appl. No.: 17/237,399

(22) Filed: Apr. 22, 2021

(65) Prior Publication Data

US 2021/0346761 A1    Nov. 11, 2021

Related U.S. Application Data

(60) Provisional application No. 63/020,544, filed on May 6, 2020.

(51) Int. Cl.
*A63B 24/00*    (2006.01)
*G06N 20/00*    (2019.01)
(Continued)

(52) U.S. Cl.
CPC ...... *A63B 24/0006* (2013.01); *A63B 24/0062* (2013.01); *G06N 20/00* (2019.01); *G06V 20/46* (2022.01); *G06V 40/20* (2022.01); *A63B 2024/0012* (2013.01); *A63B 2024/0065* (2013.01); *A63B 2024/0068* (2013.01)

(58) Field of Classification Search
CPC ........ G06N 20/00; G06V 20/40; G06V 40/20; A63B 24/00
See application file for complete search history.

(56) References Cited

U.S. PATENT DOCUMENTS 8,790,279 B2    7/2014    Brunner
9,179,862 B2    11/2015    Stergiou et al.
(Continued)

FOREIGN PATENT DOCUMENTS

CN    107480651 A    12/2017
CN    108577849 A    9/2018
(Continued)

*Primary Examiner* — Reginald A Renwick
(74) *Attorney, Agent, or Firm* — Thomas | Horstemeyer, LLP

(57) ABSTRACT

Various embodiments are disclosed for automated gait evaluation for retraining of running form using machine learning and digital video data. At least one machine learning routine is executed using video data to generate positional data of anatomical landmarks of a human or bipedal non-human subject in a video. Gait metrics and/or characteristics are determined for multiple stages of a gait cycle based on the positional data. An optimal gait cycle for a given body part or gait metric of the subject is determined and may be adjusted based on at least one covariable over time. A suggested change to movement patterns of the subject at specific timepoints or stages of the gait cycle that minimize a difference between the gait cycle of the subject and an optimal gait cycle are shown on a display device.

20 Claims, 17 Drawing Sheets

(51) Int. Cl.
*G06V 20/40* (2022.01)
*G06V 40/20* (2022.01)

(56) References Cited

U.S. PATENT DOCUMENTS

| | | | |
|---|---|---|---|
| 9,597,016 | B2 | 3/2017 | Stone et al. |
| 9,993,182 | B2 | 6/2018 | Xu et al. |
| 10,262,423 | B2 | 4/2019 | Pathak et al. |
| 10,438,136 | B2 | 10/2019 | Wang et al. |
| 10,485,454 | B2 | 11/2019 | Tas et al. |
| 10,755,817 | B2 | 8/2020 | Mariottini et al. |
| 10,842,415 | B1 * | 11/2020 | Jagannathan ............ G06N 3/08 |
| 2007/0275830 | A1 | 11/2007 | Lee et al. |
| 2008/0146968 | A1 | 6/2008 | Hanawaka et al. |
| 2012/0021873 | A1 | 1/2012 | Brunner |
| 2013/0231590 | A1 * | 9/2013 | Corbett ................... A61B 5/112 |
| | | | 600/595 |
| 2014/0276130 | A1 * | 9/2014 | Mirelman ............ A61B 5/1104 |
| | | | 600/595 |
| 2016/0007885 | A1 * | 1/2016 | Basta ..................... A61B 5/112 |
| | | | 600/595 |
| 2017/0243354 | A1 * | 8/2017 | Tafazzoli ............. A61B 5/7275 |
| 2019/0283247 | A1 * | 9/2019 | Chang .................. A61B 5/1121 |
| 2019/0290168 | A1 * | 9/2019 | Bastide .................. G16H 40/63 |
| 2020/0015712 | A1 * | 1/2020 | Hayashida ......... G08B 21/0446 |
| 2021/0059565 | A1 * | 3/2021 | Morris ................... G06V 40/25 |

FOREIGN PATENT DOCUMENTS

| | | |
|---|---|---|
| CN | 109766838 A | 5/2019 |
| CN | 110801233 A | 2/2020 |
| EP | 3656302 A1 | 5/2020 |
| IN | 201921015264 A | 5/2019 |
| WO | 2020018469 A1 | 1/2020 |

* cited by examiner

Representative Gait Cycle

Average Gait Cycle Comparison

AUTOMATED GAIT EVALUATION FOR RETRAINING OF RUNNING FORM USING MACHINE LEARNING AND DIGITAL VIDEO DATA

CROSS-REFERENCE TO RELATED APPLICATION

This application claims the benefit of and priority to U.S. Provisional Patent Application No. 63/020,544 entitled "METHOD AND SYSTEM FOR ANALYSIS OF DYNAMIC GAIT MOTION USING MACHINE LEARNING AND DIGITAL VIDEO DATA," filed May 6, 2020, the contents of which being incorporated by reference in their entirety herein.

BACKGROUND

Gait traditionally refers to locomotion achieved through the movement of limbs. In some instances, gait may be directed toward a linear path. In other instances, gait may include turning or similar movements that modify a path of motion during ambulatory activities, such as walking or running. As gait has robust associations with human health, technologies that can measure its intricacies, patterns, and various qualities are needed.

Techniques to analyze athletic movements can provide valuable information for developing preventative and corrective training exercise regimens. Such information may then be incorporated into an athletic training plan with an aim of attaining more efficient athletic performance. In addition, gait analysis can provide an objective method to detect subtleties in athletic form, particularly when applied to running, which may lead to injury and shortened athletic careers if uncorrected. Accordingly, it is important to develop technologies that can capture gait metrics and characteristics quantitatively, so that changes in these measurements may be detected early and tracked over time. Thus, gait and its qualities carry significant importance at the levels of individual and public health.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
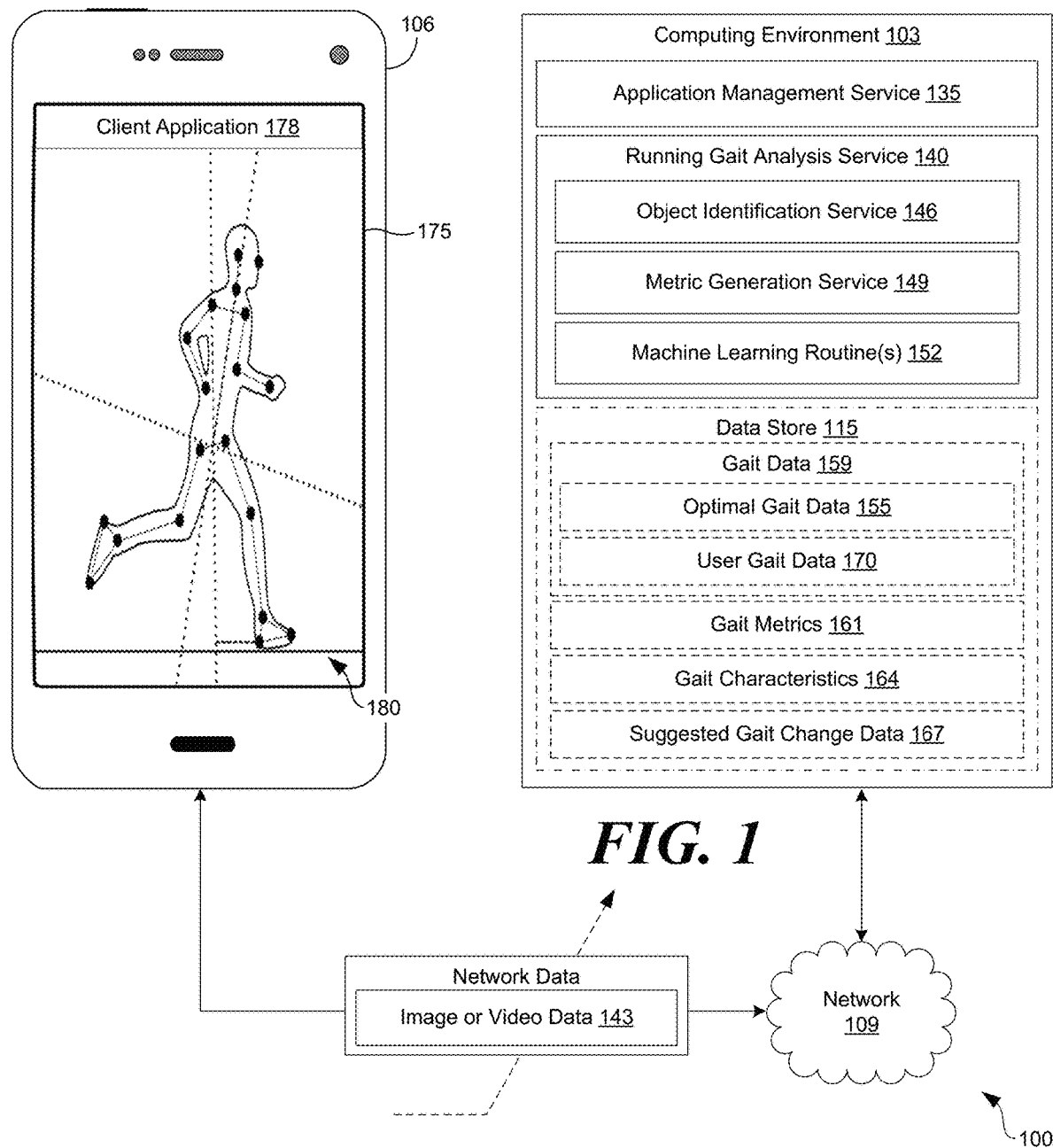
FIG. 1 is a drawing of a networked environment according to various embodiments of the present disclosure.

The present disclosure relates to automated gait evaluation for retraining form, such as running form, using machine learning and digital video data. As noted above, gait and its qualities carry significant importance at the levels of individual and public health. In many settings, athletic gait analysis is performed via a subjective evaluation of running form. These types of assessments are limited as they are inherently qualitative. In other settings, such as on an athletic field, it may not be feasible to have complex, expensive, and/or space-occupying equipment used in more formal gait analysis settings.

Even in more formal settings, video gait analysis techniques have frequently relied upon manual tagging and tracing of anatomical landmarks on single video frames, whereby body and extremity positions are interpreted via static snapshots of various stages throughout a gait cycle. This limits the quantitative evaluation of gait to singular points in time, rather than dynamic movement. Moreover, another challenge of this technique is the difficulty in choosing a few gait cycles, possibly out of hundreds of cycles, that best represent the overall average of all gait cycles.

One of the major limitations encountered in many common gait analysis settings is the requirement for complex hardware and sensor setups. Such systems can frequently require dedicated sensor equipment that is expensive and time-consuming to use. For example, U.S. Patent Publication No. 2012/0021873 A1 and U.S. Pat. No. 8,790,279 B2 describe means for gait training and analysis using endless belts and force sensors. U.S. Patent Publication No. 2008/

0146968 A1 describes a gait analysis system that depends upon force sensors attached to the feet. U.S. Pat. No. 9,179,862 B2 describes a similar system that requires sensors attached to the feet. U.S. Patent Publication No. 2007/0275830 A1 describes means for capturing dynamic gait measurements using a combination of wearable sensor data and video data. U.S. Pat. No. 9,597,016 B2 describes a system for predicting and detecting falls and injury risk, but the system depends on at least one depth sensor installation.

Accordingly, methods and systems that can capture and characterize dynamic movements over time using video data that can be captured using a mobile phone or other single imaging device are needed. Furthermore, methods and systems that offer independence from any singular computing architecture (e.g., workstation-, mobile-, virtual-, and cloud-based) and are implementable using commonly available equipment (e.g., a mobile device camera) may enable wider access to such technology.

While some systems and methods proposed have aimed to utilize machine learning of video data for gait analysis, these have focused walking gait analysis for the detection of neurological or neuromuscular diseases, the identification of adverse gait events (e.g., falling or freezing) among patients having neurological diagnoses, and tracking disease- and age-related functional decline. Since these systems and methods tend to be focused on diagnosis of disease and detection of disease-related events using walking gait data, they are additionally limited in that they do not provide suggestions for modifying gait mechanics or suggest corrective exercises to achieve optimal gait form.

Importantly, the dynamics and variables of athletic gait, such as running, differ markedly from those of walking. Moreover, the comparatively simpler characteristics of walking gait analyses cannot be translated to provide adequate analysis, diagnostic information, or suggestions for training optimal running form. International Patent Publication No. WO 2020/018469 A1, for example, has several important limitations. First, it describes use of walking gait analysis for the prediction of disease and, accordingly, is not able to provide information that can be incorporated into an athletic training regimen to improve performance or reduce injury risk. Second, it discusses summary gait statistics, but does not discuss providing analytics across the various stages of a gait cycle, which is critical for complete understanding of running form. Third, there is a lack of automated detection of camera perspective or tracking the subject of interest. Fourth, there is no measurement of response to intervention. Fifth, the aforementioned techniques utilize pixel coordinates as the variables of interest, rather than joint angles, which are more anatomically relevant and functionally meaningful. Sixth, it does not measure important gait characteristics such as foot strike (e.g., heel, midfoot, and forefoot). Seventh, it does not provide suggestions for modifying gait mechanics at specific portions of the gait cycle (e.g., impact, stance, push-off, recoil) or across the entire trial (e.g., stride length, stride angle, inter-limb dynamics, or vertical oscillation). It also does not suggest corrective exercises (e.g., targeted muscle group strength training or stretching), which may be necessary to achieve optimally efficient running form.

Finally, the techniques lack the ability to estimate ground impact forces, quantify running efficiency, or tailor results based on video data combined with demographics such as gender, height, and weight. U.S. Pat. No. 10,755,817 describes techniques to measure the extent of deviation from an average population to detect disease and medical events, but they rely on multiple calibrated cameras and are limited to waking gait. U.S. Pat. Nos. 10,438,136; 10,485,454; 10,262,423; 9,993,182; 3,656,302; and Chinese Patent Application No. 110801233 share similar limitations such as walking gait, medical event prediction, chronic disease tracking, limited camera perspectives, and/or lack of postural and upper extremity data, as well as reliance upon environmental data, three-dimensional image data, infrared image data, depth sensing, and/or wearable sensors. In conclusion, new modes of automated video-based gait analysis are needed to provide useful information to athletes to improve running form. In contrast to the relevant art, embodiments described herein offer a framework that can provide automated feedback to trainers and athletes to identify running movement patterns that can be improved, optimize running performance, and prevent injuries based on two-dimensional video data of running gait.

Detailed embodiments of the disclosure are discussed below. While specific implementations are discussed, it should be understood that this is done for exemplification purposes only. The descriptions, for purposes of explanation, have been described with reference to specific embodiments. However, the illustrative discussions are not intended to be exhaustive or to limit the invention to the precise forms disclosed. Many modifications and variations are possible. The embodiments were chosen and described in order to best explain the principles of the techniques and their practical applications. A person who is skilled in the relevant art will recognize that other components and configurations may be used without parting from the spirit or scope of the disclosure.

In the following discussion, a general description of a system for automated gait evaluation for retraining of running form using machine learning and its components is provided, followed by a discussion of the operation of the same.

With reference to FIG. 1, a networked environment 100 is shown according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include an application management service 135, a running gait analysis service 140, and other applications, services, processes, systems, engines, or functionality not discussed in detail herein. The application management service 135 may include a remote service that serves up user interface data to the client device 106, for example, to render a user interface in a display. The application management service 135 may operate in conjunction with one or more client applications of the client device 106 to provide the client applications with user interface data or other data to present in a display. Additionally, the application management service 135 may facilitate creation of a user account, collection of image or video data 143 from the client device 106 or an external imaging device in association with a user account, and other functionality as described herein.

The running gait analysis service 140 is executed to employ machine learning to analyze the image or video data 143 and generate suggestions regarding improvements to running gait or the technique associated therewith. In one example, the running gait analysis service 140 includes an object identification service 146, a metric generation service 149, and/or one or more machine learning routines 152. To this end, the running gait analysis service 140 may include a remote service executed to access image or video data 143 captured using an imaging device; invoke the object identification service 146 to identify a human or bipedal non-human subject in the image or video data 143; execute or invoke one or more of the machine learning routines 152 using the image or video data 143 to generate positional data of anatomical landmarks of the human or bipedal non-human subject; generate gait metrics and/or gait characteristics for stages of a gait cycle based on the positional data; identify an optimal gait cycle from optimal gait data 155 stored in the data store 115 for a given body part or gait metric of the subject that may be adjusted based on at least one covariable over time; determine a difference and a similarity between the gait cycle of the subject and the optimal gait cycle as a function of gait cycle completion at the stages of the gait cycle of the subject; generate a suggested change to movement patterns of the subject at specific timepoints and stages of the gait cycle that minimize the difference between the gait cycle of the subject and the optimal gait cycle; and cause the suggested change to the movement patterns to be shown in a display of a client device 106.

The data stored in the data store 115 includes, for example, gait data 159, gait metrics 161, gait characteristics 164, suggested gait change data 167, and potentially other data. The gait data 159 may include, for example, optimal gait data 155 and user gait data 170. The optimal gait data 155 may include data collected from runners having known techniques, such as professional athletes in one of a multitude of sports, such as football, distance running, soccer, and so forth. The user gait data 170 may include information collected from a user account associated with the client device 106, which may be compared to optimal gait data 155 to generate suggestions and/or determine gait metrics 161 or gait characteristics 164. The user gait data 170 may be derived from analysis of the image or video data 143 using the machine learning routines 152, as may be appreciated.

Gait metrics 161 and/or gait characteristics 164 may include alphanumeric scores or analytical values determined based on an analysis of a subject using image or video data 143 captured of the subject. To this end, gait metrics 161 may include right and left foot positions relative to pelvis or the vertical drop line from the subject's head, limb or truncal velocities, joint angle measurements, coordination, pelvic tilt, hip tilt, stride angle, forward or backward lean, truncal sway, head bounce, range of motion, foot placement at various stages of the gait cycle (e.g., strike, stance, push-off, recoil), stride length, knee valgus and varus, foot pronation or supination, estimated ground impact forces (based on known weight and video-based anatomical data), foot strike style (e.g., forefoot, midfoot, heel strike), running economy, among others.

The client device 106 is representative of a plurality of client devices that may be coupled to the network 109. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, virtual reality device, augmented reality device, or other devices with like capability. The client device 106 may include a display 175. The display 175 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 178 and/or other applications. The client application 178 may be executed in a client device 106, for example, to access network content served up by the computing environment 103 and/or other servers, thereby rendering a user interface 180 on the display 175. To this end, the client application 178 may include, for example, a browser, a dedicated application, etc., and the user interface 180 may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, a user of the client device 106 uses an imaging device (e.g., a front facing or rear facing camera, or an external camera) to capture image or video data 143, which is communicated to the computing environment 103 over the network 109. The application management service 135 may store the image or video data 143 in the data store 115 in association with a user account for analysis. Notably, some embodiments include the use of no external sensors beyond an imaging device or camera.

Next, the running gait analysis service 140 analyzes the image or video data 143 and generates suggestions regarding improvements to running gait or the technique associated therewith that may be presented in the display 175 of the client device 106. To this end, first, the running gait analysis service 140 may invoke the object identification service 146 to identify a human or bipedal non-human subject in the image or video data 143.

Next, the running gait analysis service 140 may execute or invoke one or more of the machine learning routines 152 using the image or video data 143 to generate positional data of anatomical landmarks of the human or bipedal non-human subject. Thereafter, the running gait analysis service 140 may generate gait metrics 161 and/or gait characteristics 164 for various stages of a gait cycle based on the positional data. The running gait analysis service 140 may identify an optimal gait cycle from optimal gait data 155 stored in the data store 115 for a given body part or gait metric 161 of the subject that may be adjusted based on at least one covariable over time. A difference and a similarity between the gait cycle of the subject and the optimal gait cycle may be determined as a function of gait cycle completion at the stages of the gait cycle of the subject.

The running gait analysis service 140 may then generate a suggested change to movement patterns of the subject at specific timepoints and stages of the gait cycle that minimize the difference between the gait cycle of the subject and the optimal gait cycle, and cause the suggested change to the movement patterns to be shown in a display 175 of a client device 106. For instance, the running gait analysis service 140 may interact with the application management service 135 to cause information associated with the analysis of the gait to be shown in the display 175. In some embodiments, features are augmented into an image or video, such as areas analyzed during the gait analysis, as shown in the user interface 180 of the client device 106 shown in FIG. 1.

Figure 2:
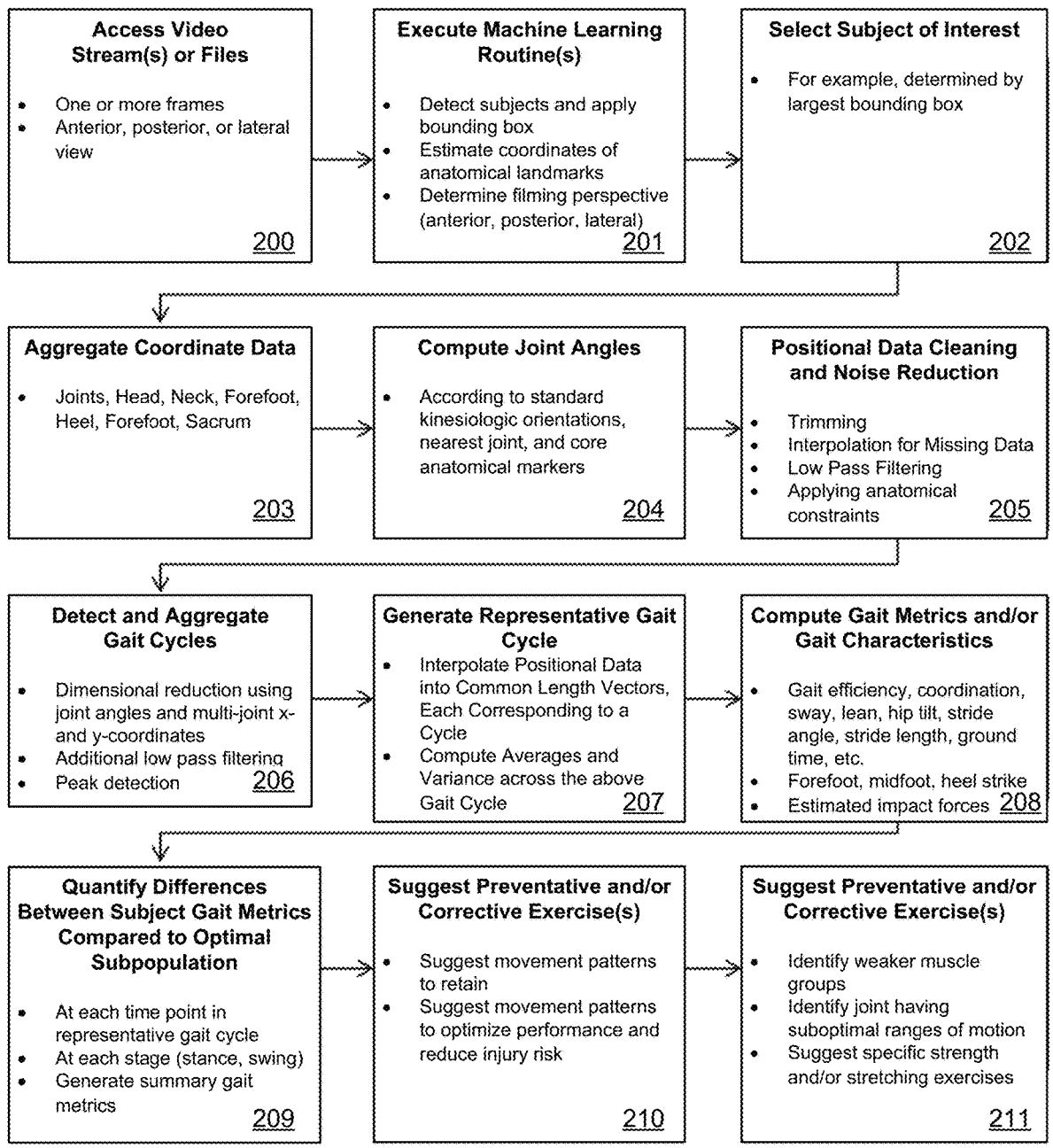
FIG. 2 illustrates an example method embodiment for computing gait metrics and characteristics across various stages of the gait cycle using video data, and for suggesting interventions to improve running gait form, identify weak muscle groups and motion-restricted joints, and suggest specific strength, flexibility, and stretching exercises, in accordance with various embodiments.

Referring now to FIG. 2, FIG. 2 shows an example flowchart for implementing a method that may be used in some embodiments for obtaining gait metrics 161, gait characteristics 164, and related kinesiologic information, and for making diagnostic predictions and therapeutic suggestions (e.g., modification of gait mechanics to more closely approximate an ideal movement pattern, strength training exercises, or stretching or myofascial release exercises) based on gait metrics 161 (as described above) and/or positional information (e.g., coordinates and/or joint angle measurements) of anatomical landmarks of one or more humans or bipedal non-human subjects. These positional data correspond with anatomical landmarks derived from machine learning applied to video data.

In some embodiments, the methods may be provided by a stand-alone application, such as the client application 178, a service or hosted service (stand-alone or in combination with another hosted service), such as the computing environment 103, or a plug-in to another product, a combination of these, and so forth. Further, in some embodiments, the image or video data 143 may be obtained by recording a video of a subject on a treadmill. In other embodiments, the image or video data 143 may be obtained by recording a subject during gait or gait-related activity on a ground surface. The image or video data 143 may be obtained passively or while actively recording the subject (e.g., video streaming or real-time processing of the video data).

At box 200, the computing environment 103 may access video stream(s) or files, such as the image or video data 143 received from the client device 106. For instance, in some embodiments, the image or video data 143 may be accessed from a user-supplied file or data stream, or by an application (e.g., client application 178) or computing device (e.g., client device 106). While the image or video data 143 may often comprise red-green-blue (RGB) digital images or grayscale images, it may include other data such as depth, thermal, or infrared information.

At box 201, at least one machine learning routine 152 is executed using video frames comprising at least one digital image as an input to determine filming perspective (e.g., anterior, posterior, lateral, and so forth), detect subjects therein, apply one or more bounding boxes around the subject, and/or perform anatomical pose estimation where coordinates of anatomical landmarks are estimated. It should be noted that various embodiments may differ with regard to the number and types of machine learning routines 152 used for detection of subjects and estimation of anatomical landmarks. Some variations may include separate machine learning routines 152 for subject detection and anatomical landmark prediction. In addition, the methods and systems described herein are not limited in scope by the use of any particular type of machine learning model over another.

The one or more machine learning routines 152 may be trained using a predefined dataset, require different arrangements of data input, and may provide different data outputs. The one or more machine learning routines 152 may be exchanged, improved, and/or retrained. However, as an example of a possible embodiment, an object detection machine learning routine 152 may be used to detect subjects and create bounding boxes, and, thereafter, estimate anatomical landmark coordinates (referred to as pose estimation). Anatomical landmark coordinates may include coordinates of the joints, head, neck, forefoot, heel, forefoot, sacrum, as well as other body parts as may be appreciated.

In some embodiments, one or more of the machine learning routines 152 includes a convolutional neural network (CNN) or a related model, which is a type of machine learning models that perform relatively well on image-based predictions. The CNN machine learning routine 152 may be trained using hundreds or thousands of images and corresponding labels, such that a CNN machine learning routine 152 may be executed to perform object detection and pose estimation. In various embodiments, the CNN machine learning routine 152 may initially estimate anatomical pose using an initial coarse estimation, then perform a cascade of regression steps based on cropped images to generate final anatomical position estimates.

Another machine learning routine 152 that may be used in some embodiments is a multi-resolution CNN model architecture. The multi-resolution CNN machine learning routine 152 may utilize a sliding window detector to produce a coarse heat map as part of the initial processing of an image, which may perform better than traditional CNNs in some implementations. Another approach that may be used in some embodiments is a machine learning routine 152 that maintains a high-resolution representation throughout the process, such as a high resolution network (HRNet) or related model. The HRNet machine learning routine 152 begins with a high-resolution subnetwork and gradually adds lower resolution sub-networks in parallel. Information is repeatedly exchanged across various resolutions, so that a high-resolution representation may be maintained.

A variant of CNNs, the residual neural network (ResNet) machine learning routine 152 may also be used in some embodiments. This model architecture makes use of skip connections in order to avoid vanishing gradients in deeply layered neural networks. Finally, some embodiments may make use of at least one machine learning routine 152 that performs object detection, object tracking, and pose estimation using individual digital images from video frames as input, or multiple digital images from multiple video frames as inputs. Techniques that utilize gradients or similar techniques to track movement from one image to another based (e.g., flow) may also be used in some embodiments. Another variation that may be used in some embodiments is a machine learning routine 152 that incorporates information regarding natural anatomical constraints in order to limit the number of likely poses. The types of machine learning routines 152 described herein used only as examples of possible machine learning architectures and techniques that could be used to estimate anatomical landmark positioning and are not intended to be limiting. In some embodiments, anatomical landmark data may be obtained through a third party augmented reality application programming interface.

Figure 3:
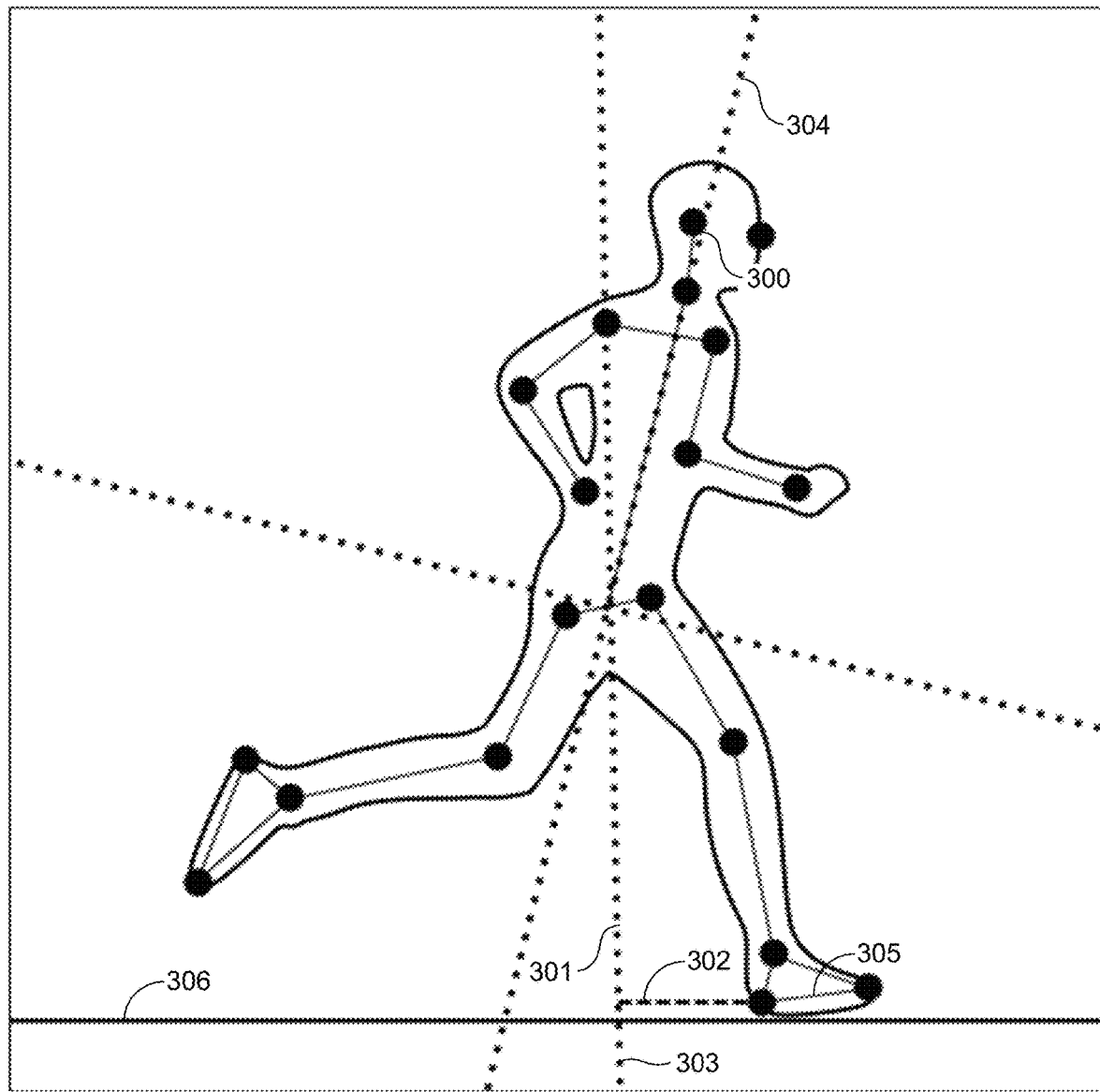
FIG. 3 illustrates example anatomical landmarks and measurements corresponding to a lateral view of a subject, in accordance with various embodiments.
Figure 4:
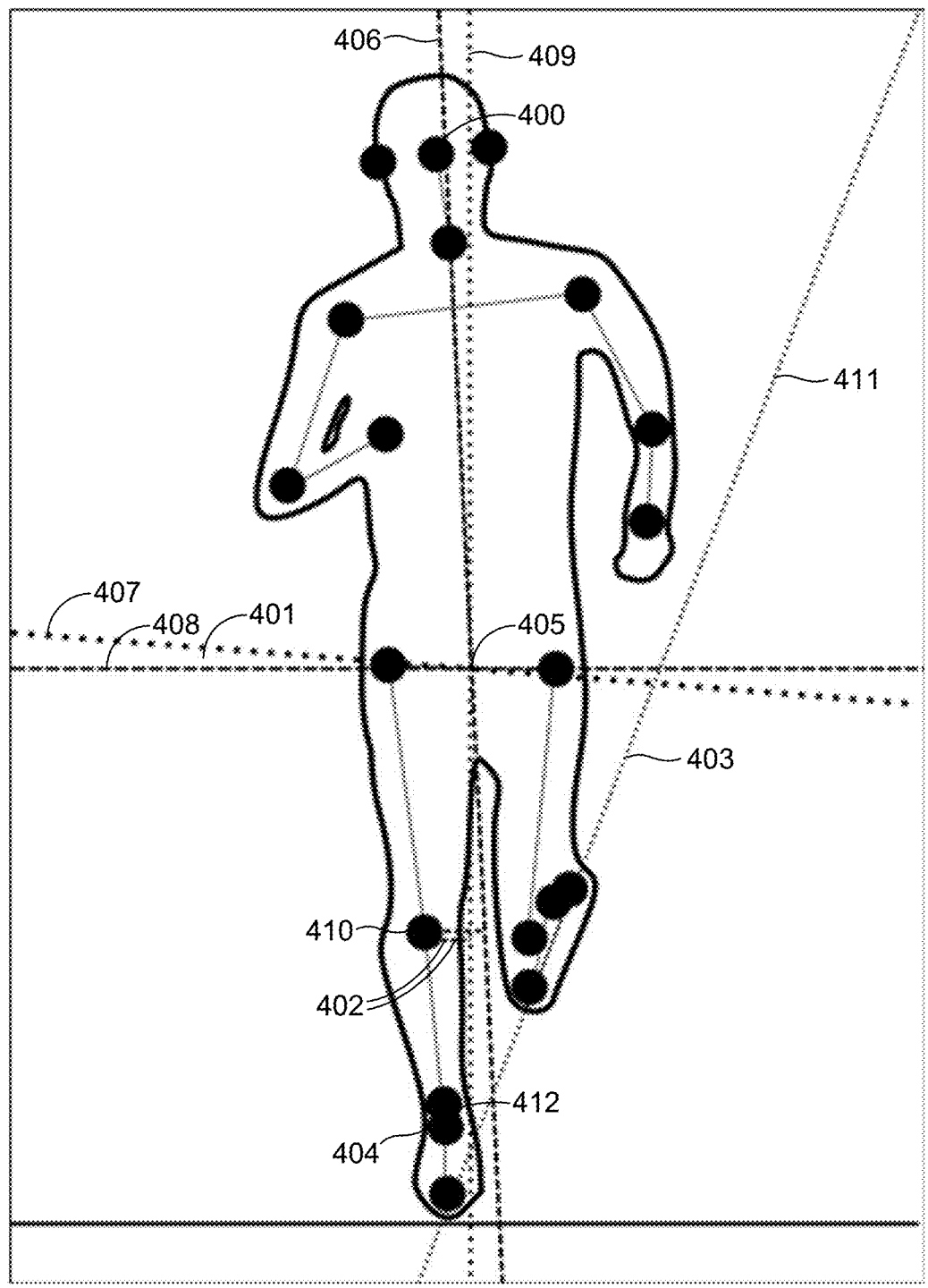
FIG. 4 illustrates example anatomical landmarks and measurements corresponding to an anterior or posterior video of a subject, in accordance with various embodiments.

Video frames may include digital images of subjects in various views, such as anterior, posterior, right lateral, or left lateral, any combination thereof, or similar views. It is understood that, if a machine learning routine 152 is unable to identify a metric, an angle, or other information from one or more video frames at a first view (e.g., anterior), then the machine learning routine 152 may be executed using video frames of a second, different view (e.g., posterior) until a metric, angle, or other information is able to be discerned having an estimated accuracy exceeding a predefined threshold (e.g., 95%). As such, FIGS. 3 and 4 are the lateral and posterior views of a subject, respectively. Each of these views has its own set of metrics that we can get from that viewpoint, but potentially not the other. For example, the machine learning routine 152 may determine foot strike style (heel, midfoot, forefoot) from FIG. 3, the lateral view of the subject. However, if it is desirable to obtain foot pronation or supination, the machine learning routine 152 would execute using frames of a subject in a video, as shown in FIG. 4, the posterior view of the subject. In some embodiments, an anterior view of the subject may be utilized to obtain related or additional metrics such as knee valgus or varus, or femur rotation.

In some embodiments, a first machine learning routine 152 is used to detect subjects within one or more video frames and create at least one bounding box to have a rectangular shape (or other suitable shape) containing the at least one human and/or bipedal non-human subject. A second machine learning routine 152 may then be applied to the areas of the video frames within the bounding boxes to obtain coordinates of anatomical landmarks, as shown FIG. 3 and FIG. 4. In some embodiments, the coordinates of anatomical landmarks may be two-dimensional. In other embodiments, the coordinates of anatomical landmarks may be three-dimensional. It may be expected that performance of the machine learning routines 152 may differ depending upon model architecture and training. In some embodiments, one or more trained machine learning routines 152 may be used, replaced, exchanged, and upgraded without changing the overall spirit of the methods described herein. As such, the first machine learning routine 152 may be a same or different type than the second machine learning routine 152.

In box 202, one or more subjects of interest may be selected based on the bounding box. In some embodiments, the subjects of interest are selected based on the bounding box having a greatest area. In some embodiments, known characteristics of the subject of interest may be determined for identification, such as facial features, body morphology, clothing, or other available images of the subject of interest. In some embodiments, multiple subjects of interest may be selected. However, for purposes of explanation, this example will discuss an embodiment in which a single subject of interest is selected. It is understood that the analysis of a single subject may be extracted to multiple subjects.

In box 203, the coordinates of anatomical landmarks and/or other coordinate data may be aggregated into a vector, array, matrix, data frame, or related data structure. The anatomical landmarks may include, but are not limited to, ankles, knees, hips, shoulders, elbows, wrists, sacrum, heel, and forefoot.

In box 204, joint angle measurements may be computed for joints such as ankles, knees, hips, shoulders, elbows, wrists, neck, and sacrum are calculated at each data structure index that corresponds with each video frame index. In some variations, joint angle measurements and related information may already be available, and the previously mentioned process may not be needed to calculate the joint angle measurements. The result thereof includes at least one series data structure comprising signals of anatomical landmark coordinates and/or joint angle measurements.

In box 205, various embodiments may include performing data cleaning and noise reduction on positional data, such as the coordinates of anatomical landmarks. For instance, trimming may be applied to the beginning and end of the data structure comprising signals. Interpolation may be used to estimate the values of coordinates and/or joint angle measurements in cases of missing data points. Low pass filtering may be used for signal smoothing. In some embodiments, additional normalization processes may be performed to account for variations in subject height and weight, and anatomical landmark coordinates may be recalculated to be relative to the subject's center of mass, pelvis, trunk, or another given point. The purpose of such is to account for movement or drifting of the subject's location within the video frame. For example, if the subject moves from left to right or from top to bottom across the video frame, this may result in excess noise in future processing. Thus, it may be necessary to normalize coordinate data to a position that is relative, such as the moving average of the subject's pelvis, center of mass, or neck. In some variations, in order to increase accuracy and reduce noise, mathematical constraints based on known anatomy may be applied to act as hard or soft limits on positional values.

In box 206, some embodiments may include gait cycle detection and aggregation of positional information over one or more gait cycles. In an example of gait cycle aggregation, peak detection may be employed to detect a given point in each gait cycle. For example, peak detection may be used to detect the lowest vertical coordinate of an anatomical landmark.

Figure 5:
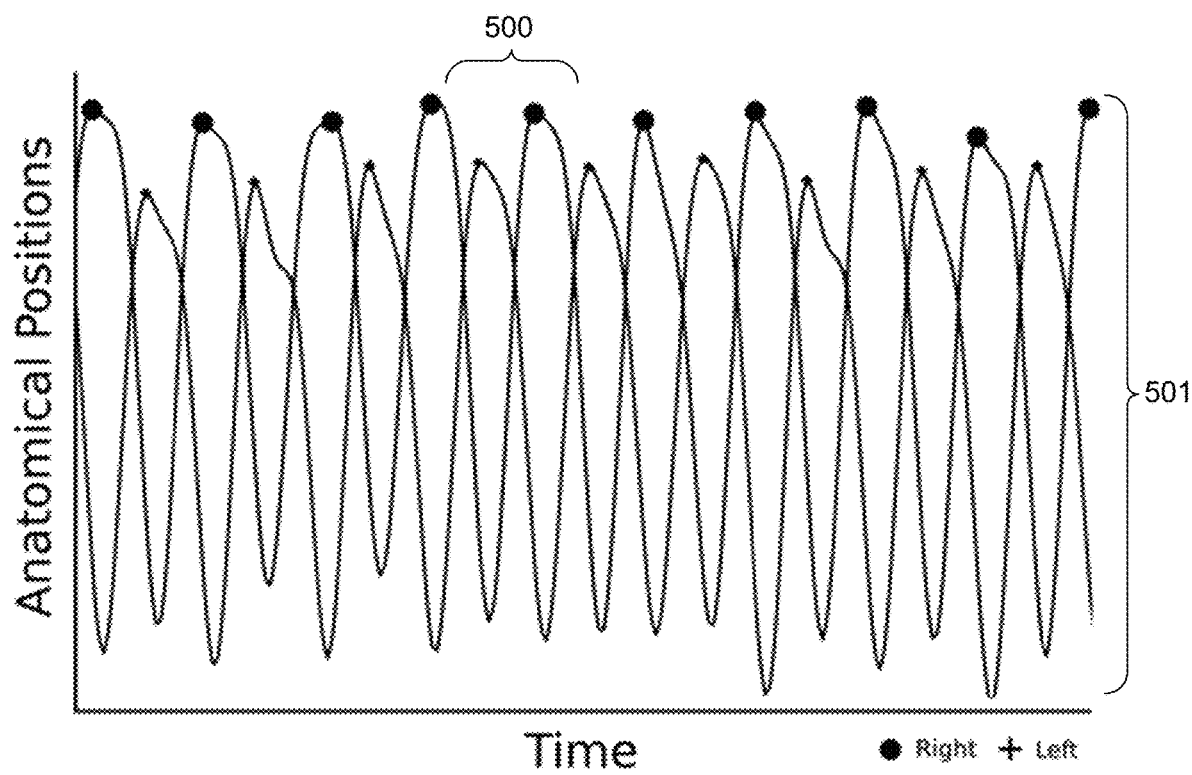
FIG. 5 illustrates an example plot of running gait cycles of left and right extremities where, as an example, knee angle measurements are used although any anatomical landmark coordinate(s) or joint angle measurements, or a dimensionally reduced composite of body parts or joint angle measurements may be used, in accordance with various embodiments.

FIG. 5 illustrates an example plot of gait cycles of left and right extremities. In this example, ankle vertical coordinates are used. However, any anatomical landmark coordinate(s) or joint angle measurements, or a dimensionally reduced composite of body parts or joint angle measurements may be used. In the example, the peaks represent a set point in the gait cycle. Note that not all gait cycles are necessarily of equal time. Referring back to box 203, gait cycles may be aggregated in separate vectors or data structures. Each gait cycle may be represented as the series of values corresponding to the anatomical landmark positional data within a peak-to-peak interval 500, as shown in FIG. 5. The values of the positional data for the anatomical landmarks, or a related composite variable, may be entered into a vector for each peak-to-peak interval 500. Subsequently, the gait cycle vectors may be transformed by interpolation or a similar technique into common length vectors.

Figure 6:
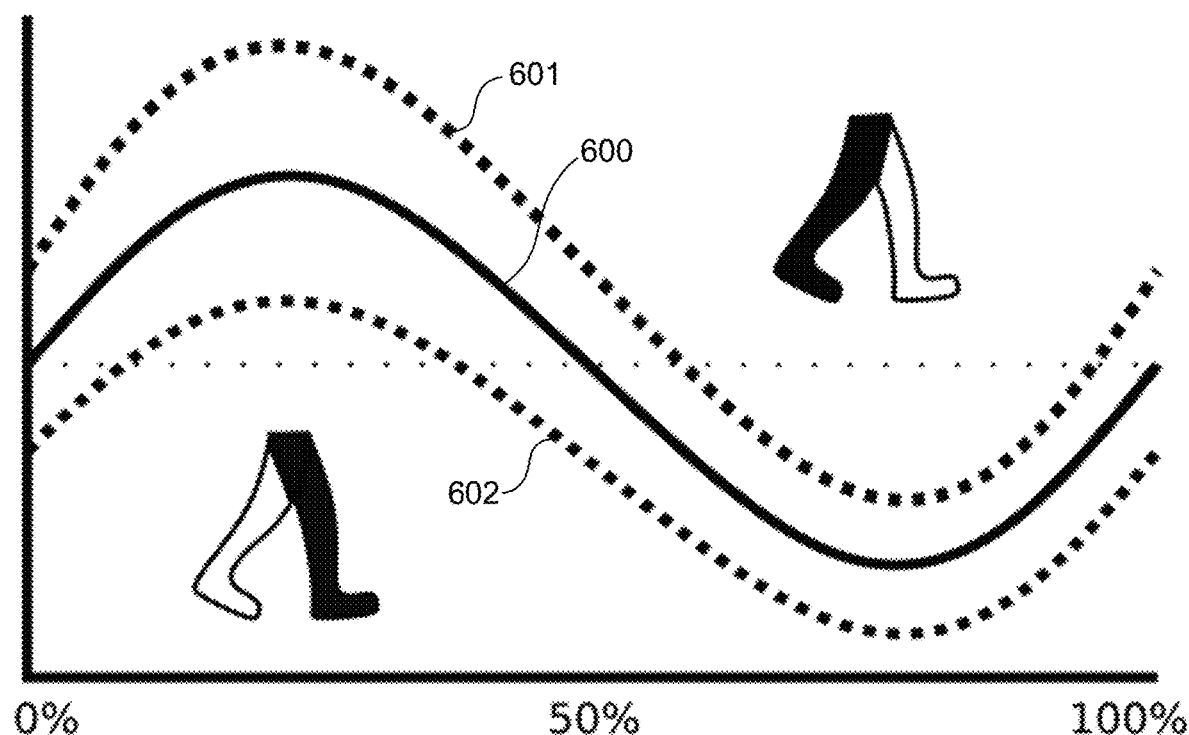
FIG. 6 illustrates an example representative gait cycle, with mean (solid curve) and variance (dotted curve) of positional data over a plurality of gait cycles, in accordance with various embodiments.

In some embodiments, representative gait cycles, as shown in FIG. 6, may be generated by averaging the values of the positional data at each index of the common length gait cycle vectors. Referring to both FIG. 2 and FIG. 6, in box 207, one or more representative gait cycles may be generated. The resulting representative gait cycles 600 may represent average values and measurements of variance in values of anatomical landmark positions over a typical or average gait cycle. The representative gait cycles of each anatomical landmark, body positioning, or composite value may then be compared in box 209 to determine similarities, differences, or percentile rank with representative gait cycles obtained from multiple subjects (e.g., a subpopulation of interest such as elite or injury-free running subjects, other elite athletes, or any other subpopulation). In other words, in box 209, the subject gait metrics 161 are compared to an optimal subpopulation to quantify differences and/or similarities. This may be performed at each time point in a representative gait cycle, at each stage (e.g., stance and swing), and so forth.

For example, a representative gait cycle 600 of a subject and characteristics for a given joint angle, or other positional metric, may be compared with those of an optimal gait cycle 601, 602. The amplitudes and variances of optimal gait cycle amplitudes may be derived from subpopulations of interest, such as elite and/or injury-free athletes, or athletes having similar demographics to a user of the client application 178 while having better technique or running performance. However, optimal gait cycle amplitudes and variances may also be adjusted for covariables of interest such as distance or speed goal, actual running speed, age, gender, weight, height, and fatigue over time. They may, conversely, be generated using theoretical reference ranges.

Referring back to FIG. 2, in box 208, gait metrics 161 and/or gait characteristics may be computed or otherwise determined, such as gait efficiency, coordination, sway, lean, hip tilt, stride angle, stride length, ground time, and so forth. Additionally, individual ones of these features may be determined relative to forefoot, midfoot, heel strike, and so forth. Further, in some embodiments, estimated impact forces may be determined based on the foregoing information.

Figure 7:
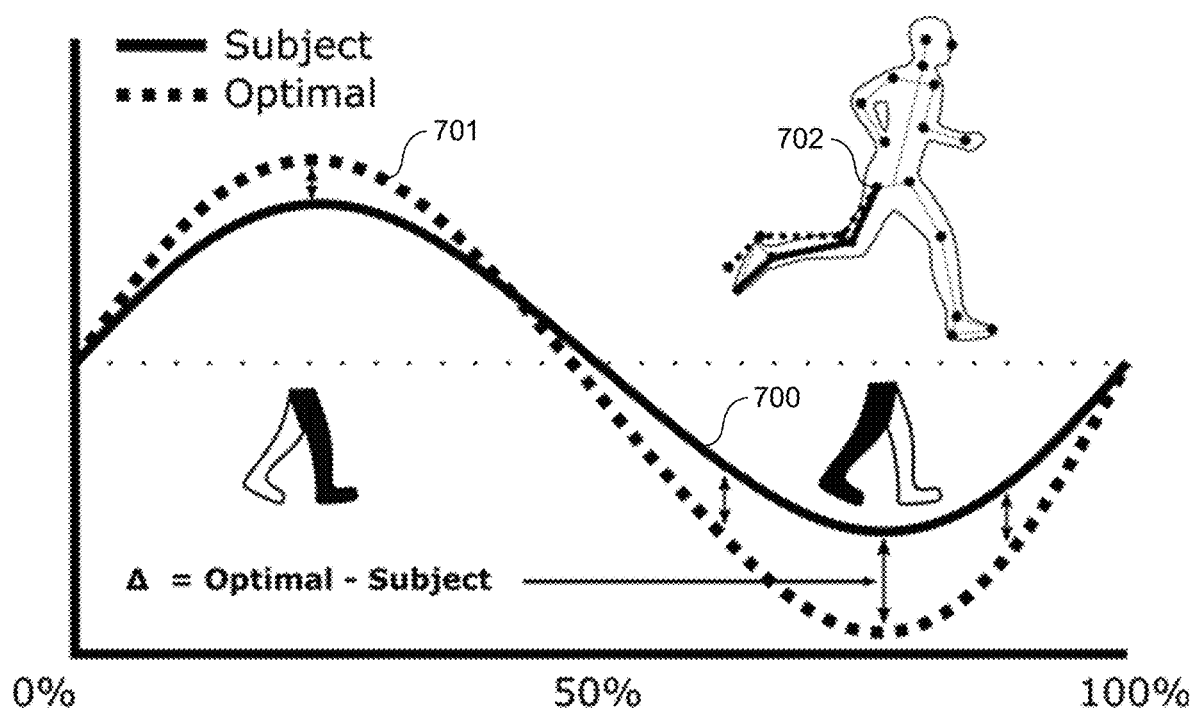
FIG. 7 illustrates an example system embodiment of a comparison between a subject's individual representative gait cycle and an optimal gait cycle, in accordance with various embodiments.

In box 210, one or more machine learning routines 152 trained using the positional data and/or representative gait cycles of one or more subpopulations may be used to make comparisons with optimal gait cycles 601, 701, identify and suggest movement patterns that should be retained, and suggest adjustments to movement patterns so that a subject's gait can be retrained and transformed to minimize the differences with that of the optimal gait cycle 601, 701 and characteristics associated therewith. Referring briefly to FIGS. 6 and 7, in some embodiments, the comparison between a representative gait cycle 600, 700 of a subject and an optimal gait cycle 601, 701 for a given joint 702 angle or other metric such as relative positioning can be computed using the differences 703 (e.g., normalized or non-normalized) in amplitude(s) between said subject's representative gait cycle 600, 700 and an optimal gait cycle 601, 701 throughout the gait cycle and gait stages (e.g., strike, stance, and swing).

Referring again to FIG. 2, in box 211, in some embodiments, one or more machine learning routines 152 and/or predefined rule-based routines may be utilized to suggest preventative and/or corrective exercises and/or modifications of gait mechanics as part of a gait retraining program. For instance, a third machine learning routine 152 may be executed to generate suggested preventative or corrective actions, such as strength training, myofascial release, or stretching exercises to perform. Such suggestions may include the identification of specific weak or imbalanced muscle groups, joints having suboptimal ranges of motion, risk of specific injuries, and the suggestion of specific strength and stretching exercises as part of a gait retraining program.

The one or more machine learning routines 152 utilized to analyze gait similarities and differences and to make suggestions for gait retraining may have varying machine learning architectures. In addition, gait metrics 161 that would ordinarily be difficult to obtain using only video-based gait recordings may be estimated by using the anatomical landmark data as inputs to machine learning models that have been trained to estimate gait characteristics 164 that are not directly observable. For example, the machine learning routines 152 may be trained using the video-derived positional data as input variable (e.g., features) and non-video-based measurements as output (e.g., predicted) variables. Such measurements may include but are not limited to force plate measurements, accelerometer data, gyroscopic data, gait metrics 161, gait characteristics 164, clinical information, fitness wearable information, workplace data, or medical data. As an example, a long short term memory (LSTM) model may be used in some embodiments to make predictions based on time series data such as joint angle measurements and vertical oscillation. In this example, the joint angle measurements and vertical oscillation could be utilized to predict ground impact forces (via a model trained using force plate data). As another example embodiment, a multilayer neural network may be used to make predictions based on gait metrics 161 and/or gait characteristics 164. As with the object detection and pose estimation steps, the exact machine learning routines 152 and training techniques used are not distinguished, may be interchanged, and are not intended to be limiting.

In some embodiments, gait may be evaluated or rated based on reference ranges, average metrics, and variance statistics of gait metrics 161, gait characteristics 164, or representative gait cycles, or by comparison to subpopulations. Reference ranges for determining the normal minimum and maximum values for the gait measurements and representative gait cycles may be determined from their respective distributions. Representative gait cycles may be used to identify specific moments within a typical gait cycle that deviate from optimal gait cycles, using reference ranges and/or subpopulation comparisons.

Referring to FIGS. 3 and 4, in some embodiments, vertical oscillations may be approximated by subtracting the instantaneous vertical coordinate of the subject's head 300, 400 from the moving average of the vertical coordinate of the subject's head. Vertical oscillation may be normalized by a known height of the subject. A summary statistic of this metric may be generated using measurements of variance such as standard deviation or percentile ranges.

In some embodiments, gait metrics 161 may be computed, comprising measurements such as symmetry (e.g., of right and left positions, velocities, joint angle measurements) coordination, hip tilt 401 (e.g., to quantify Trendelenburg gait), pelvic tilt, stride angle, forward or backward lean 301, 304, truncal sway 406, 409, head bounce 400, range of motion 501, foot placement at strike 302, stride length, knee valgus and varus 402, foot pronation or supination 403, 404, ground impact forces, foot strike style (e.g., forefoot, midfoot, heel strike) 305, 306, maximum knee flexion on recoil, and running economy. Changes in these gait metrics 161 or at various time segments during a trial may be computed as well. Symmetry may be calculated using formulas such as angle of asymmetry, asymmetry index, or related formulas. Coordination of limbs and/or truncal motion may be calculated using mutual information, normalized mutual information, maximum cross coordination, or other metrics of correlation. Metrics of coordination may be calculated for inter limb dynamic relationships (e.g., joint angle measurements of left and right knees) or for limb-body or limb-composite relationships (e.g., joint angle measurements and vertical oscillation). Pelvic tilt may be calculated in the lateral view(s) using multiple points along the waistline.

Hip tilt may be calculated in the anterior or posterior views by the measurement of the angle 401 formed by the intersection of an extended line segment 406 formed by the neck and the sacrum and an extended line segment 407 starting at one hip and ending at the other hip. An alternative includes measuring the angle of the hip-to-hip line relative to the horizontal axis 408 of the video. Other alternatives include measuring the angle of the hip-to-hip line 407 relative to the ground, as determined by a machine learning model. Stride angle may be calculated as the angle of the parable tangent that is derived from an arc traced by a foot during a stride and the ground. Ground contact time may be estimated using peak detection of foot strike and foot liftoff and the ratio of intervals between these events. Alternatively, a machine learning model may be applied to the positional data to estimate ground contact time. Forward lean, backward lean, and truncal sway may be calculated by measuring the angle formed by the vertical axis 303 of the video and the line segment starting at the sacrum and ending at the neck 304. Variations of truncal sway metrics may be derived from metrics of velocities, accelerations, and variability of the angle formed by the vertical axis 409 of the video and a line 406 intersecting the sacrum and ending at the neck. Range of motion 501 may be calculated for joint angle measurement using the range or a metric of variability over video frames.

Foot placement at strike may be calculated by estimating the horizontal distance between the sacrum and forward foot at foot strike, and may be normalized by body height. Knee valgus and varus 402 may be calculated using the anterior or posterior view, by measuring the shortest distance between the knee 410 and the line that intersects the sacrum and the neck 406. This measurement may be normalized in various ways, such as body height or leg length. Foot pronation and supination 404 may be estimated in the anterior or posterior views by measuring the angle formed by the knee 410, ankle 404, and heel 412. They may also be estimated using the rotation of the foot at liftoff, as determined by the rotation of the line 403 intersecting the heel and forefoot of the elevated foot.

Ground impact forces may be estimated using a supplied weight of the subject and measurements of acceleration of the body geometric center of mass and the deceleration of the impacting extremity. Foot strike style may be estimated using the lateral view(s) by the measurement of the angle formed by the line segment 305 intersecting the heel and forefoot of the impacting extremity and the horizontal axis 306 of the video or an axis that is estimated via machine learning to be parallel the ground surface. Running economy may be estimated by the ratio of running speed (supplied by user or another source, or estimated by a machine learning model) to body vertical oscillations. Cadence may be estimated by number of peaks detected per unit time or by Fourier transformation and fundamental frequency analysis. Stride length may be calculated by estimating the horizontal distance traveled by the foot during ground contact interval.

In some embodiments, logic- or probability-based rules or decision trees based may be used to generate or predict results, insights, or suggestions, such as preventative or corrective exercises. These rules or decision trees may be developed using knowledge of physical therapy, athletic training, or other clinical disciplines. The results, insights, or suggestions such as exercise interventions may be used independently by a user or may be combined with the interpretation and knowledge of a clinical or athletic professional to formulate final exercise interventions. The results, insights, or suggestions at any point in this process may be annotated onto a video, derived from the original video data, and displayed for the user. They may also be displayed on a user interface, stored, or transmitted.

Figure 8:
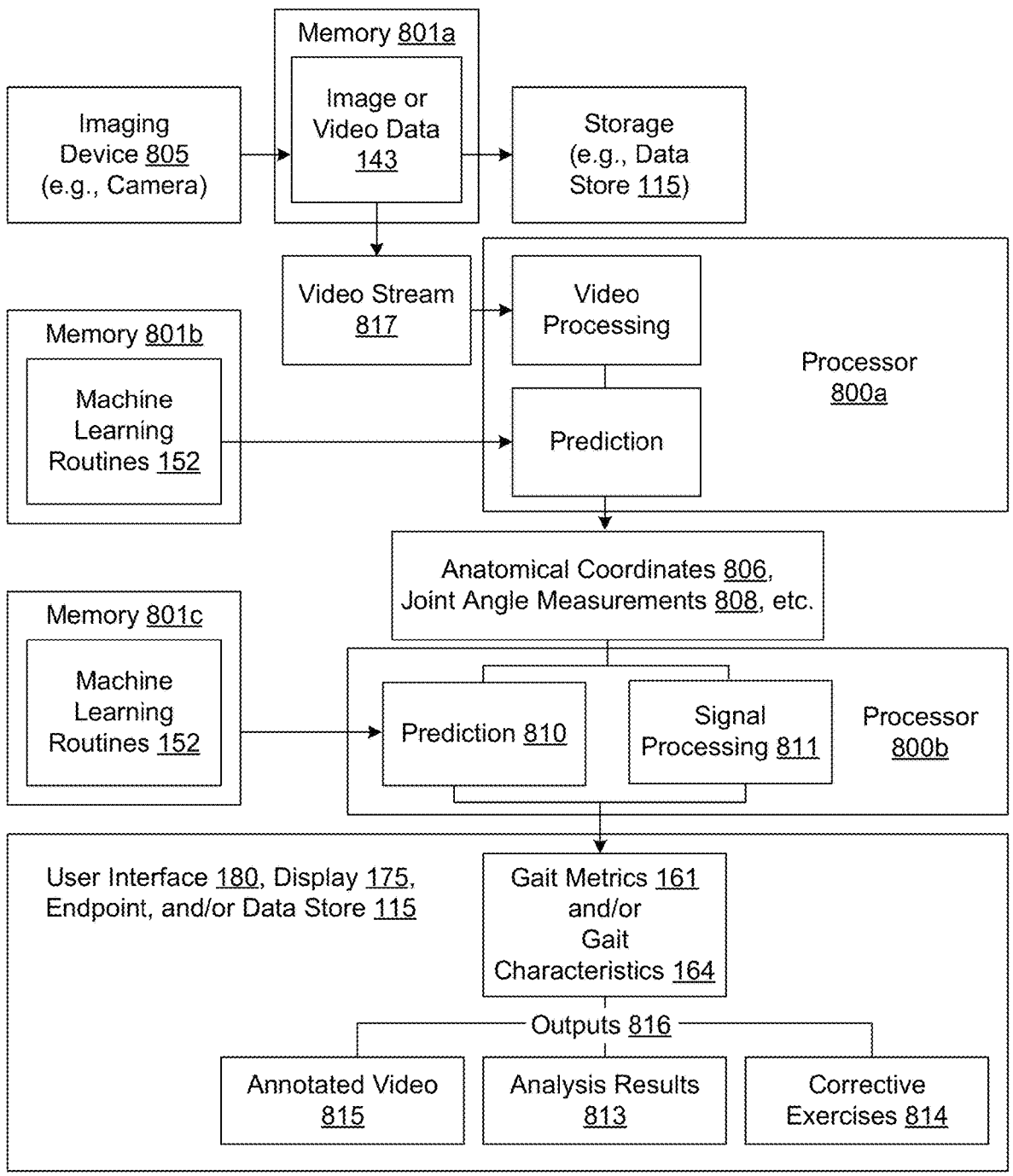
FIG. 8 illustrates an example system embodiment of a technical architecture for computing running gait metrics and characteristics based on video data, and for making predictions related to injury and suggestions for preventative and corrective exercises, in accordance with some embodiments.

FIG. 8 illustrates an example system that facilitates the methods described herein. In some embodiments, the system includes a computing environment 103 comprising at least one processor 800*a*, 800*b*, at least one memory 801*a* . . . 801*c*, and one or more computer-readable media having stored thereon program instructions or code that are executable by the one or more processors 800, such as hardware processors. Various applications and/or other functionality may be executed in the computing environment 103 or the client device 106 according to various embodiments. The computing environment 103 in some embodiments may be physical or virtualized, or local or remote, or any other system providing computing capability.

The computing environment 103 and/or the client device 106 in some embodiments may include various types of computing devices, such as one or more mobile devices, one or more tablets, one or more, laptop computers, one or more workstations, one or more servers or server banks, or one or more virtual computing instances (e.g., virtual machines, nodes, pods, containers, instances). Such computing devices may be located in a single installation, may be embedded within other devices such as robotics, or may be distributed among many different geographical locations. For example, the computing environment 103 may include a plurality of computing devices that together may comprise a hosted or "cloud" computing resource, a grid computing resource, mix of local and "cloud"-based resources (e.g., "edge" and "fog" environments), and/or any other distributed computing arrangement. In some cases, the computing environment may correspond to an elastic computing resource where the allotted capacity of processing, network, storage, or other computing-related resources may vary over time.

The embodiments described herein offer several advantages over the existing state of the art. First, in that they are able to evaluate gait metrics 161 and measurements as a function of gait cycle stage (strike, stance, swing) and gait cycle completion. Second, optimal gait cycles from subpopulations (e.g., elite and/or injury-free athletes) may be used to identify a subject's targets for running form improvement (e.g., muscular imbalances or weaknesses, movement patterns, timing of limb and body movements, posture, motion-restricted joints), and the effects of interventions may be tracked over time. Third, suggestions regarding strength, flexibility, and stretching exercises, as well as specific changes to running movement during gait, may be generated programmatically based on gait metrics 161 and/or gait characteristics 164 in order to improve running form.

Referring back now to FIG. 8, which illustrates an example embodiment, image or video data 143 may be supplied to a memory 801 that is accessed by at least one processor 800. Variations of this step may include receipt or transmission of data through at least one imaging device 805 (e.g., a camera), input/output (IO) bus, network connection, non-transient storage (e.g., data store 115), or any other means of supplying video data to the memory 801. The at least one processor 800 may compute bounding boxes for at least one subject and predicts anatomical coordinates 806 by accessing one or more machine learning routines 152 that are stored in a memory 801 and applying model weights to single- or multi-frame video data.

Additional data such as thermal, multi-camera video, accelerometer, or depth data may be included in some embodiments to increase accuracy. The at least one processor 800 may then compute joint angle measurements 808 from the anatomical coordinates 806. At least one processor 800 applies a machine learning model 152 that is stored in memory 801 to make diagnostic and/or therapeutic prediction, and generate an annotated view 815. In some embodiments, the signal processing 811 steps described in the methods herein are applied by at least one processor 800 to compute gait metrics 161 and gait characteristics 164. In some embodiments, logic-based or probability-based instructions (e.g., decision trees, heuristics, fuzzy logic, and related techniques) may be executed by the at least one processor to make diagnostic and/or therapeutic predictions.

In some embodiments, the one or more processors 800 use various data from previously described processes to predict fatigue, injury, muscular imbalance, strength characteristics, risk of injury, suboptimal movement pattern, gait economy, running efficiency, or other analysis results 813 or diagnostics, and to determine preventative and/or corrective exercises 814.

There are multiple ways in which the at least one processor 800 may compute these predictions. For example, in a simple variation, the at least one processor 800 makes these predictions using rules and thresholds (e.g., decision trees or heuristics) applied to gait metrics 161, gait characteristics 164, anatomical coordinates 806, joint angle measurements 808, or a combination of these. In other embodiments, the one or more processors 800 may make these predictions using one or more machine learning routines 152 or models. Determination of preventive or corrective exercises 814 may also be executed by the one or more processors 800 using the previously mentioned data and combinations of the aforementioned data.

In some embodiments, the one or more processors 800 utilize image or video data 143 stored in memory 801 to generate video frames that have visually illustrated representations of anatomical coordinates, joint angle measurements, results, predictions, gait metrics 161, gait characteristics 164, preventive or corrective exercises, other predictions, or any combination of these that are computed by the one or more processors Some embodiments may include one or more outputs 816 of the results, predictions, gait metrics 161, gait characteristics 164, anatomical coordinates, joint angles, preventive or corrective exercises, or other predictions computed by the one or more processors 800. Such outputs may include a physical display device, a user interface, memory, transient storage, non-transient storage, or an endpoint such as one or more hardware bus, IO protocol, web service (e.g., representational state transfer (REST), simple object access protocol (SOAP), JavaScript object notation (JSON), or any network or web service protocol), application programming interface (API), or blockchain interface.

In some embodiments, the at least one processor 800 may include one or more central processing units (CPUs), one or more graphical processing units (GPUs), one or more tensor processing units (TPUs), a combination thereof, or any other physical or virtual device that is able to execute computing instructions.

Although the various blocks of FIG. 8 are shown with lines for the sake of clarity, in reality, these blocks represent logical, not necessarily actual, components. For example, one may consider a video stream 817 from at least one imaging device 805 or a presentation component such as a display device to be an I/O component. In addition, the processors 800 may include memory. Moreover, the illustrated storage media may be virtualized, physical, local, or geographically distributed. As some computing environments may be loaded entirely into memory, there may be no distinction between memory 801 and the data store 115 in some embodiments. The inventors hereof recognize that such is the nature of the art and reiterate that the diagram of FIG. 8 is merely illustrative of an example computing environment that can be used in connection with one or more embodiments of the present invention.

Figure 9:
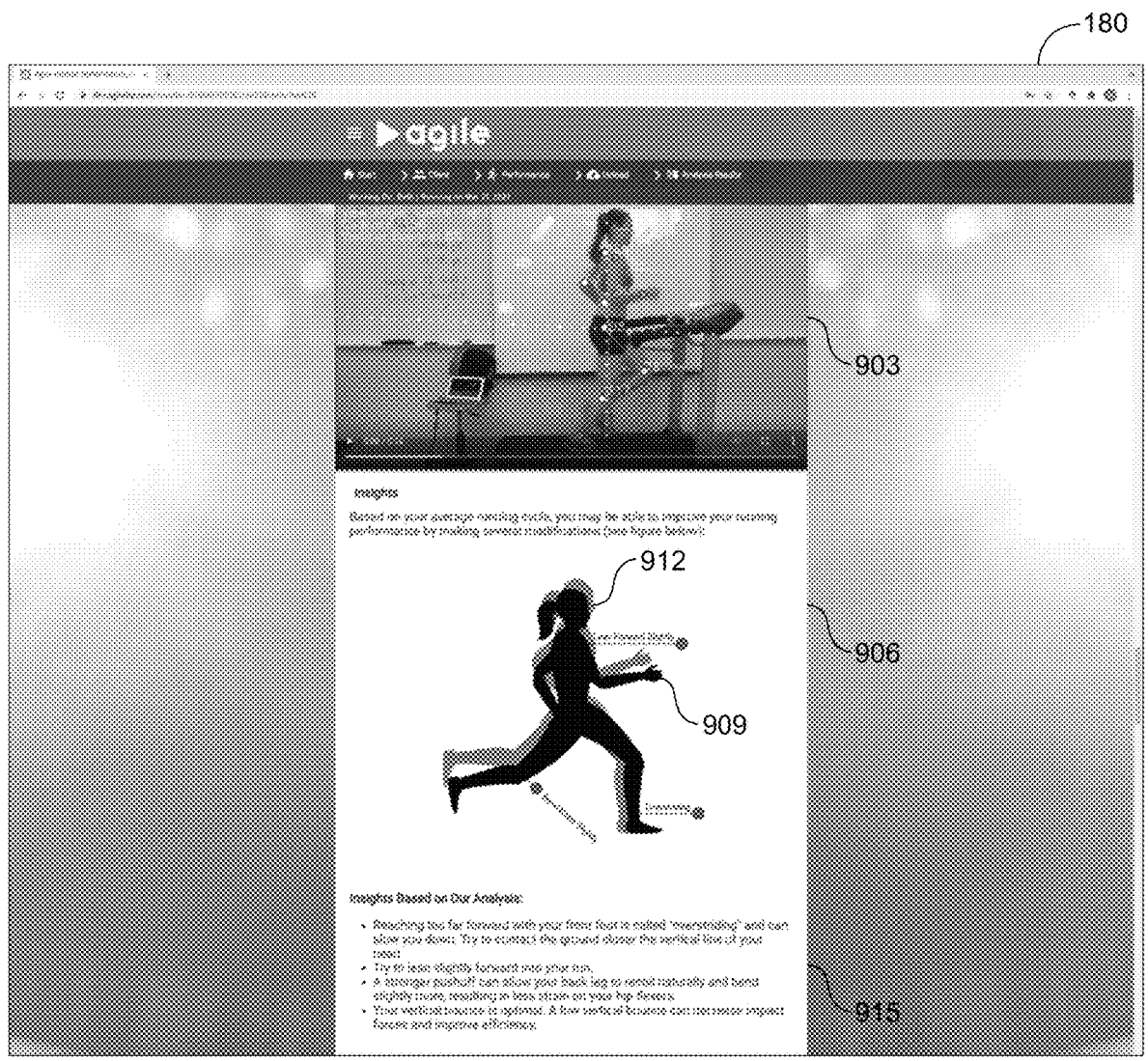
FIGS. 9 and 10 are example user interfaces of a desktop application executed in the networked environment of FIG. 1 in accordance with various embodiments.
Figure 10:
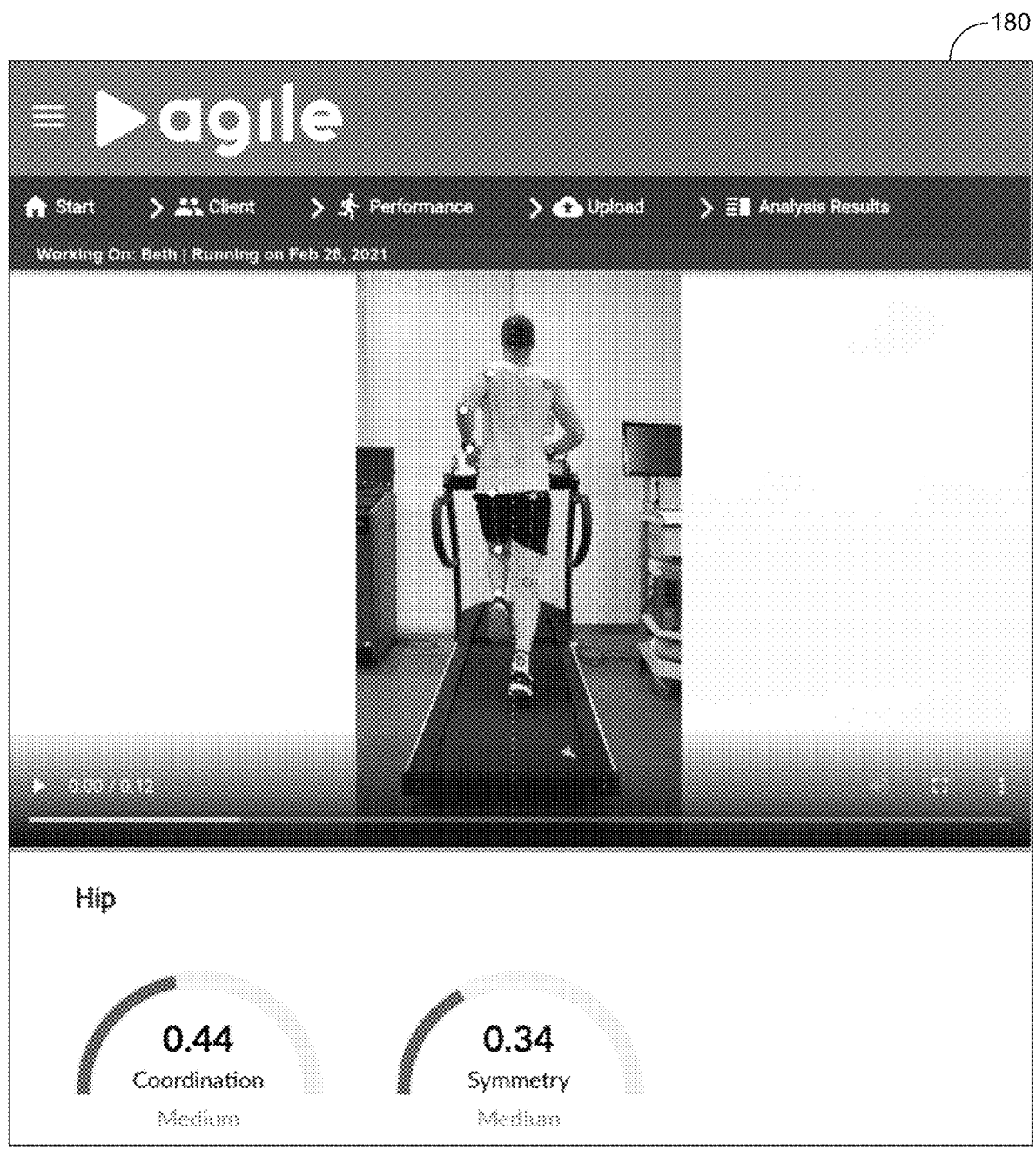
Figure 11:
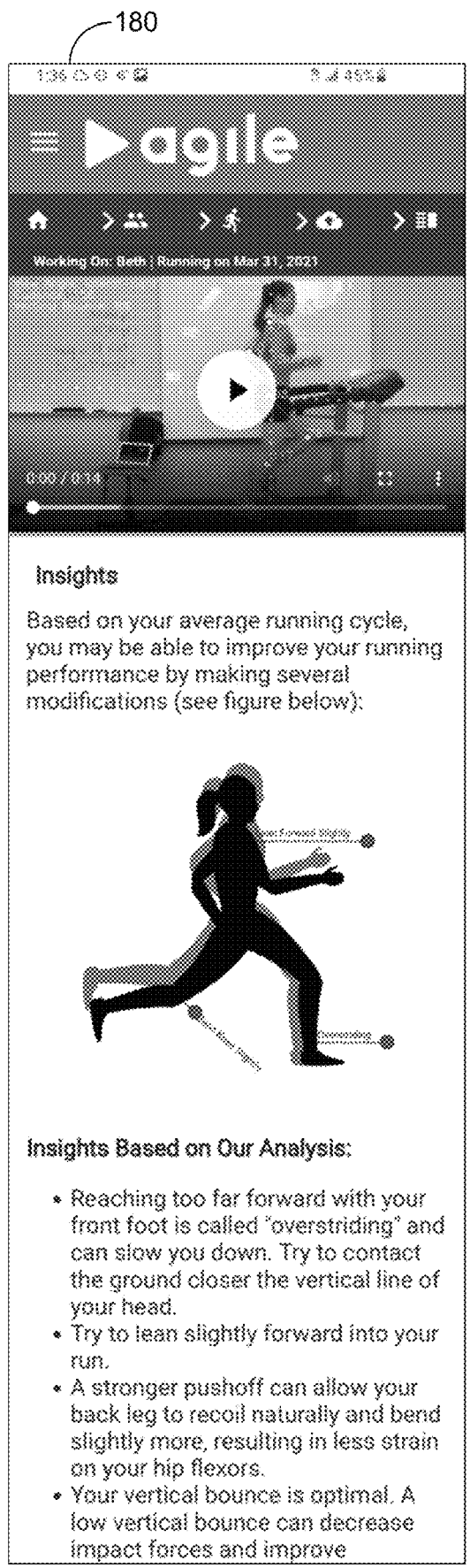
FIGS. 11-15 are example user interfaces of a mobile application executed in the networked environment of FIG. 1 in accordance with various embodiments.
Figure 12:
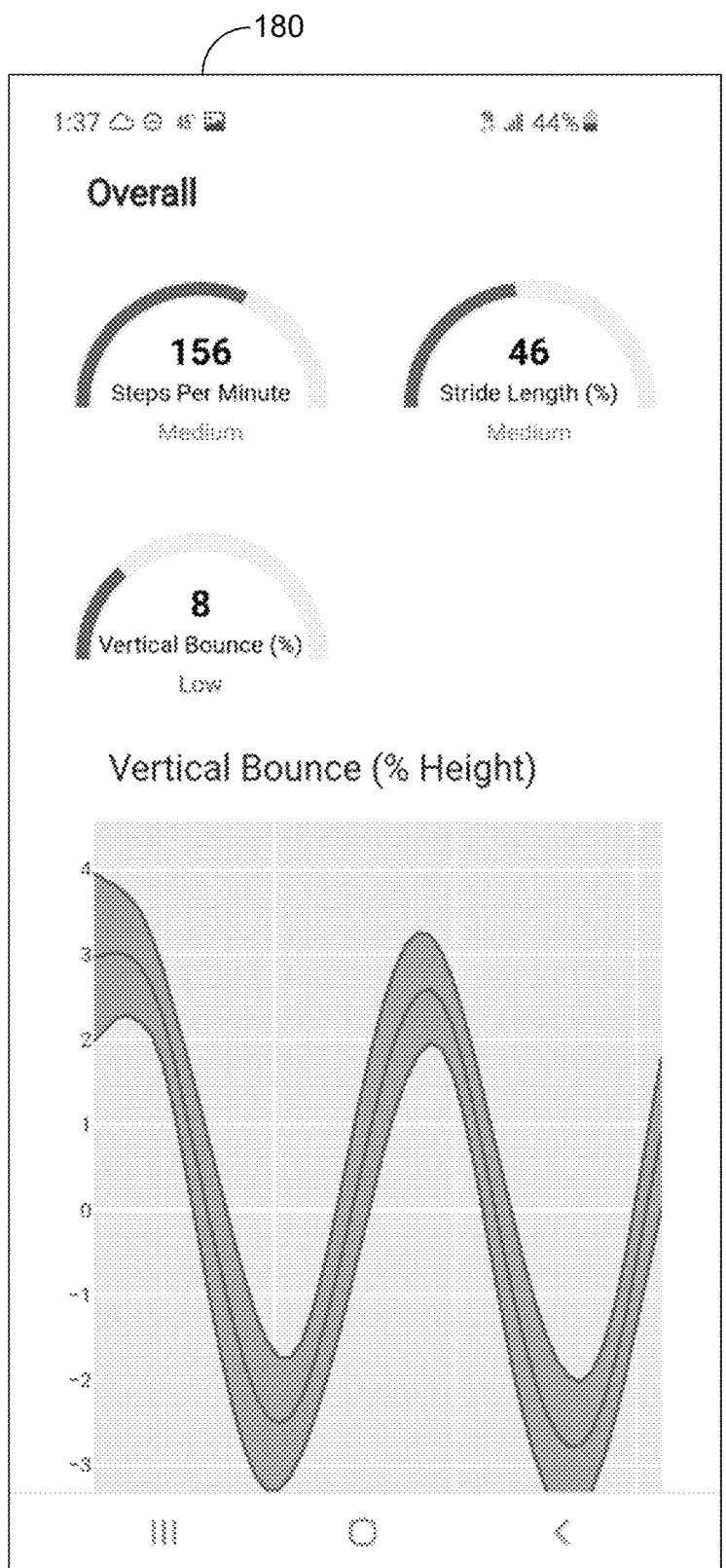
Figure 13:
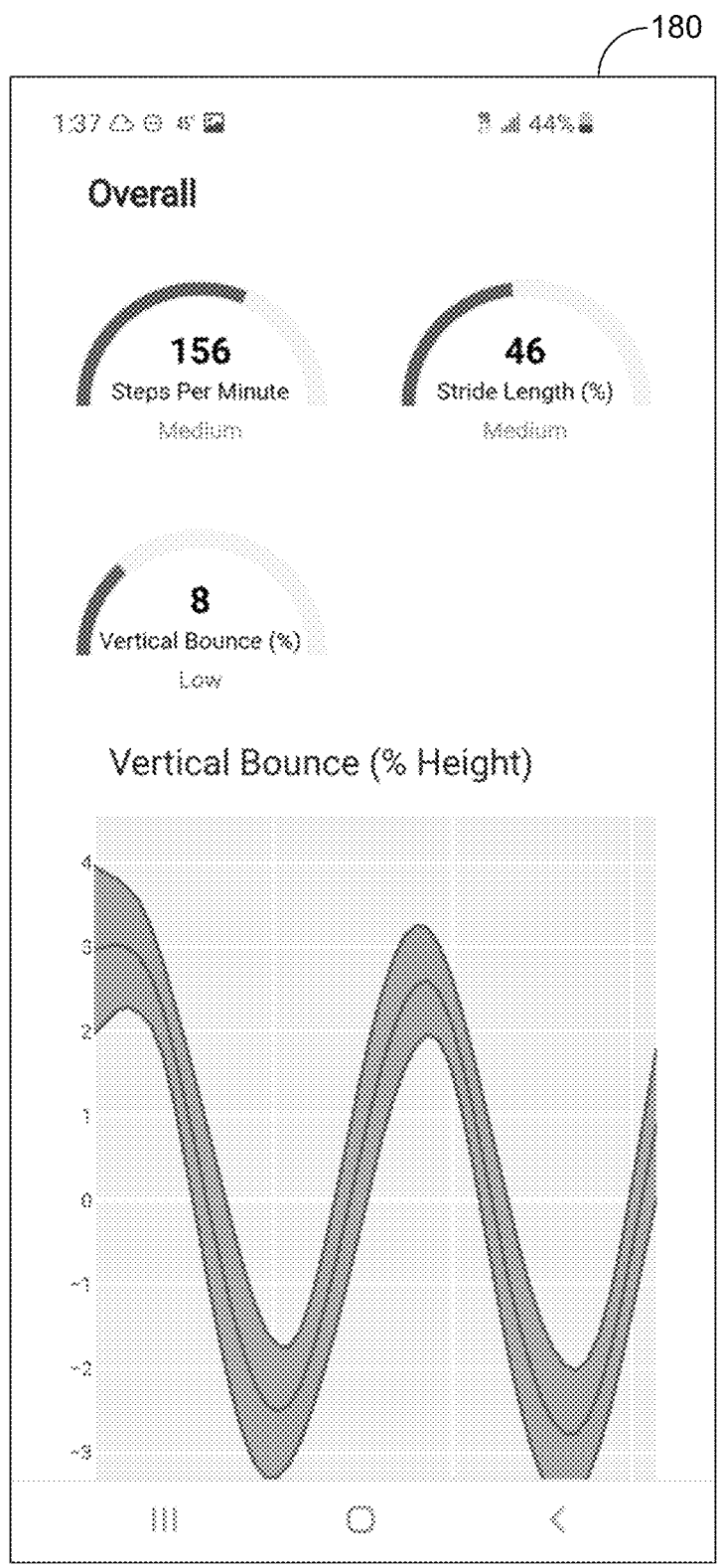
Figure 14:
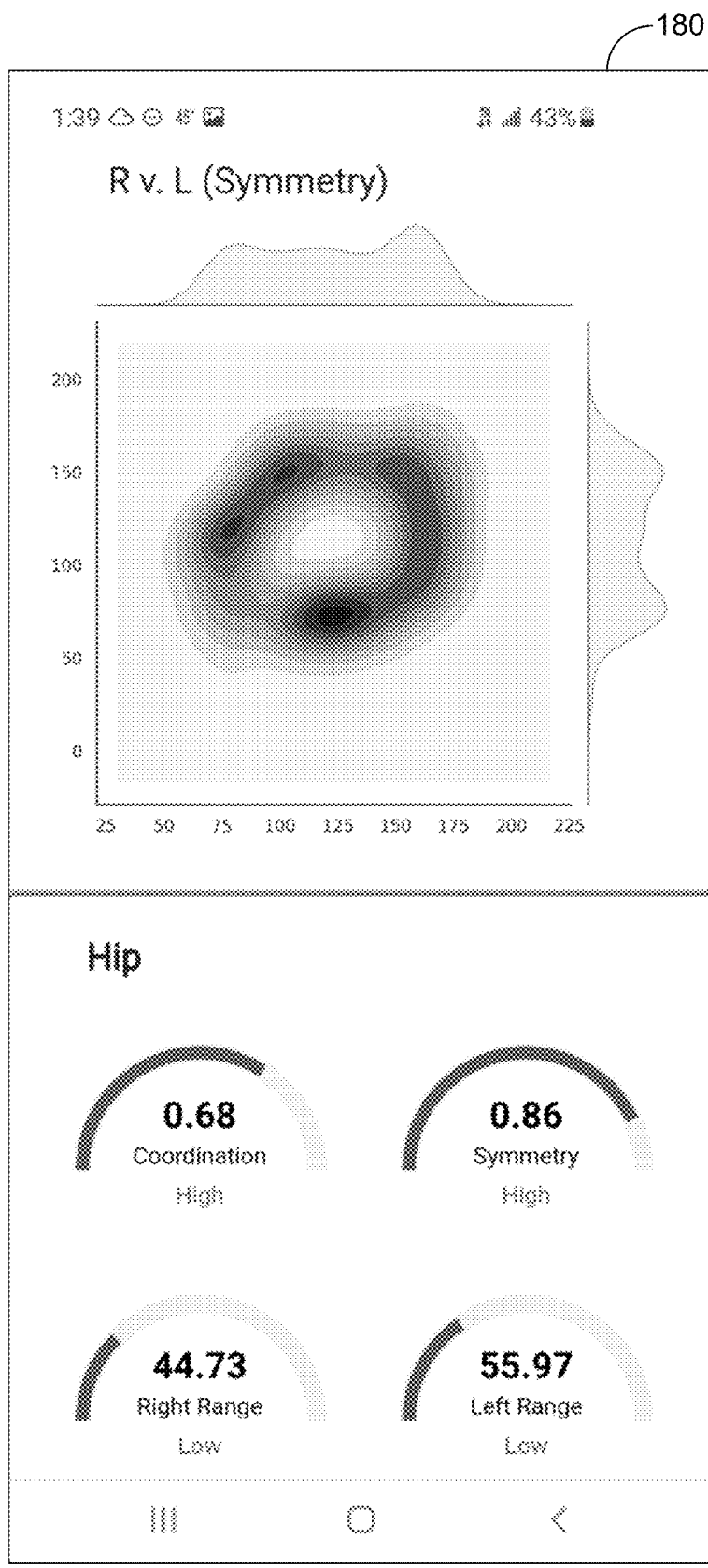
Figure 15:

Turning now to FIGS. 9-15, various example user interfaces 180 are shown for display in a client device 106 in accordance with various embodiments. Specifically, the user interfaces 180 of FIGS. 9 and 10 show a user interface 180 that may be displayed in a web browser type of client application 178, whereas the user interfaces 180 of FIGS. 11-15 show example user interfaces 180 for display in a mobile type of client application 178 (also referred to as a "mobile app"). Generally, the user interfaces 180 may include a first region 903 that includes a video that may be captured using an imaging device 805, such as a camera, shown relative to a second region 906 having insights regarding running gait analyzed from the video of the first region 903.

Referring to FIG. 9, the first region 903 includes the video with augmented features imposed thereon. Specifically, the augmented features may include anatomical landmarks detected that are imposed on the video using coordinates determined using the one or more machine learning routines 152. For example, circles are imposed on the detected features, such as ankles, knees, hips, shoulders, elbows, wrists, sacrum, heel, and forefoot. Metrics may be imposed relative to these circles identifying the detected features, which may include gait metrics 161 for example.

The second region 906 includes various insights identified using machine learning applied to the video. Such insights include suggestions to "learn forward slightly," "bend knee slightly," and an instruction to correct "overstriding." A representative image 909 of the runner is shown relative to an optimal image 912 of an ideal running technique. Additional data regarding the insight may be shown in a third region 915 of the user interface 180. FIG. 10 shows gait metrics 161 included in the user interface 180 corresponding to a frame of the video as shown in the user interface 180 at a given moment in time. Additionally, various charts and heat maps may be shown that assist runners in analyzing how to improve running gait.

Figure 16:
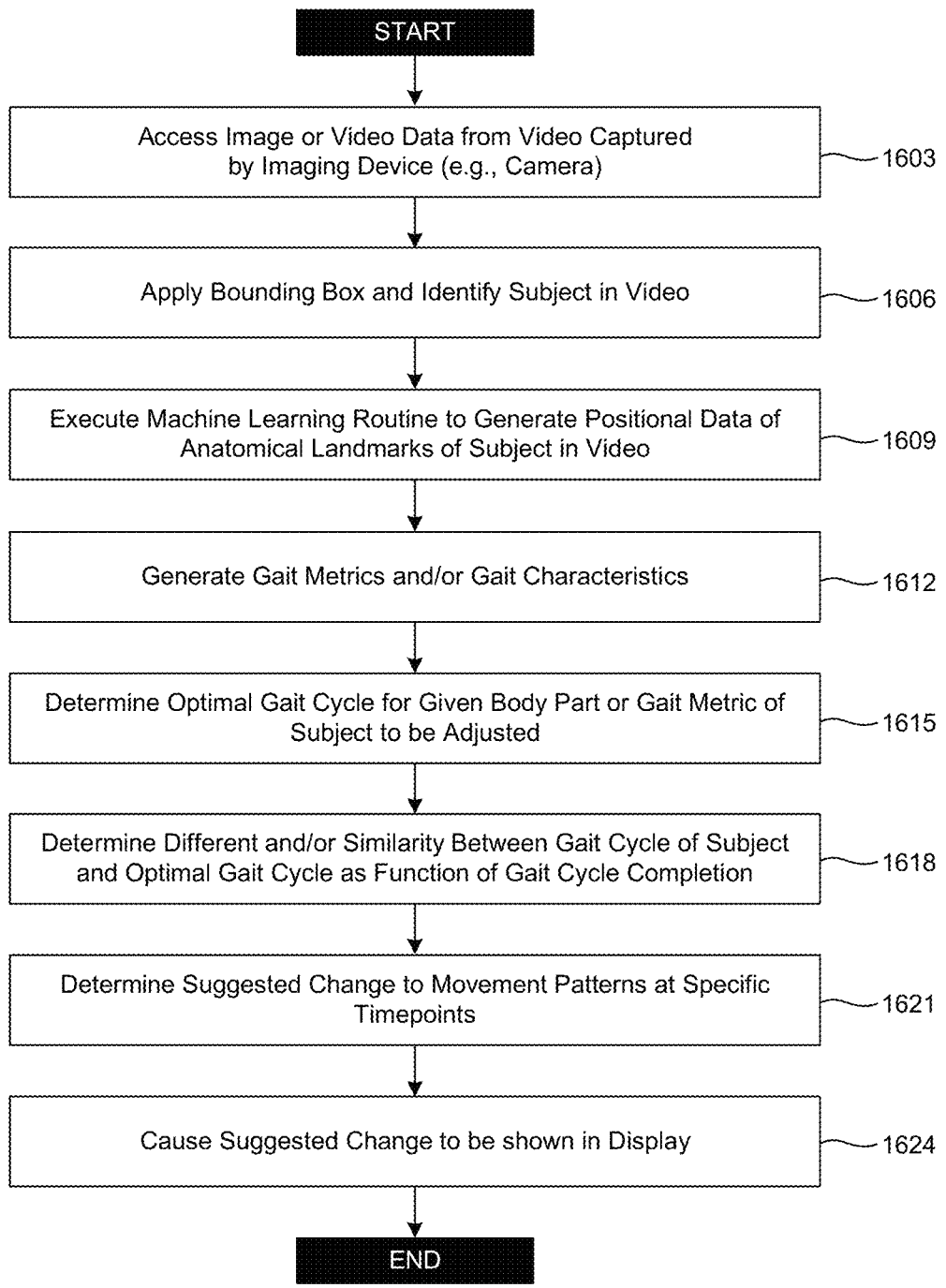
FIG. 16 is a flowchart illustrating one example of functionality implemented as portions of a computing environment and/or a client device in the networked environment of FIG. 1 according to various embodiments of the present disclosure.

Referring next to FIG. 16, a flowchart 1600 is shown that provides one example of the operation of a portion of the client device 106 and/or the computing environment 103 according to various embodiments. It is understood that the flowchart of FIG. 16 provides merely an example of the many different types of functional arrangements that may be employed to implement the operation of the portion of the client application 178 and/or the services of the computing environment 103 as described herein. As an alternative, the flowchart of FIG. 16 may be viewed as depicting an example of elements of a method implemented in the computing environment 103 and/or the client device 106 according to one or more embodiments.

Beginning with 1603, video data may be accessed from at least one video captured by at least one imaging device 805. In 1606, a bounding box may be applied and a largest one of the bounding boxes may be used to identify a subject in a video. The subject may include a human or bipedal non-human subject in the video (e.g., a robot). In 1609, at least one machine learning routine 152 may be executed using the video data to generate positional data of anatomical landmarks of a human or bipedal non-human subject in the video.

In 1612, at least one of a gait metric 161 and a gait characteristic 164 may be generated for each of a plurality of stages of a gait cycle based at least in part on the positional data. Also, a gait cycle may be determined using peak detection. In 1615, at least one of an optimal gait cycle for a given body part or gait metric 161 of the subject may be determined that is adjustable or may be adjusted based on at least one covariable over time.

In 1618, a difference and/or a similarity between the gait cycle of the subject and the optimal gait cycle may be determined as a function of gait cycle completion and at each of the plurality of stages of the gait cycle of the subject. In 1621, a suggested change to movement patterns of the subject at specific timepoints and stages of the gait cycle may be determined that minimize the difference between the gait cycle of the subject and the optimal gait cycle. Finally, in 1624, the suggested change to the movement patterns may be caused to be shown in a display 175, such as that of the client device 106. The suggested change may include a suggestion associated with footwear, muscle group activation, and visualization of running form.

In some embodiments, the at least one machine learning routine 152 is a plurality of machine learning routines. To this end, the method may include executing the at least one machine learning routine 152 using the video data to generate the positional data of the anatomical landmarks of the human or bipedal non-human subject in the video by executing a first one of the plurality of machine learning routines 152 to detect the subject within at least one frame of the video and create at least one bounding box containing the at least one human and/or bipedal non-human subject, and executing a second one of the plurality of machine learning routines 152 using areas of the at least one frame of the video within the at least one bounding box to obtain coordinates of anatomical landmarks and joint angle measurements.

The method may further include identifying a candidate target for improvement and a pattern at risk for injury, and causing a specific strength and flexibility exercise for gait retraining to be shown in the display 175. At least one of the stages of the gait cycle may include a strike stage, a stance stage, and a swing stage. As such, the at least one covariable is one of a goal speed, a goal distance, age, gender, height, weight, limb and truncal length, and fatigue. At least one of the candidate targets that may be identified for improvement includes a potentially weak or imbalanced muscle group or a potentially motion-restricted joint.

In some embodiments, the method further includes applying at least one of digital signal processing, parametric statistical analysis, and non-parametric statistical analysis to the positional data of the anatomical landmarks to determine the gait metric 161 or the gait characteristic 164. Further, the at least one machine learning routine 152 may be a first one of a plurality of machine learning routines 152. As such, the method further includes executing a second one of the plurality of machine learning routines 152 using the positional data of the anatomical landmarks to determine the gait metric 161 or the gait characteristic 164.

The gait metric 161 or the gait characteristic 164 may be selected from a group consisting of: a symmetry measurement, a coordination measurement, a range of motion measurement, a stride length, a cadence, a pelvic tilt, a vertical oscillation, a head tilt, a hip tilt, a stride angle, a forward lean, a backward lean, a postural sway, a foot placement at foot strike, a foot placement at foot push off, a femur rotation amount and velocities, a knee valgus, a knee varus, a foot pronation, a foot supination, an estimated ground impact force, a forefoot strike, a midfoot strike, a heel strike, a gait economy, and any combination thereof.

Figure 17:
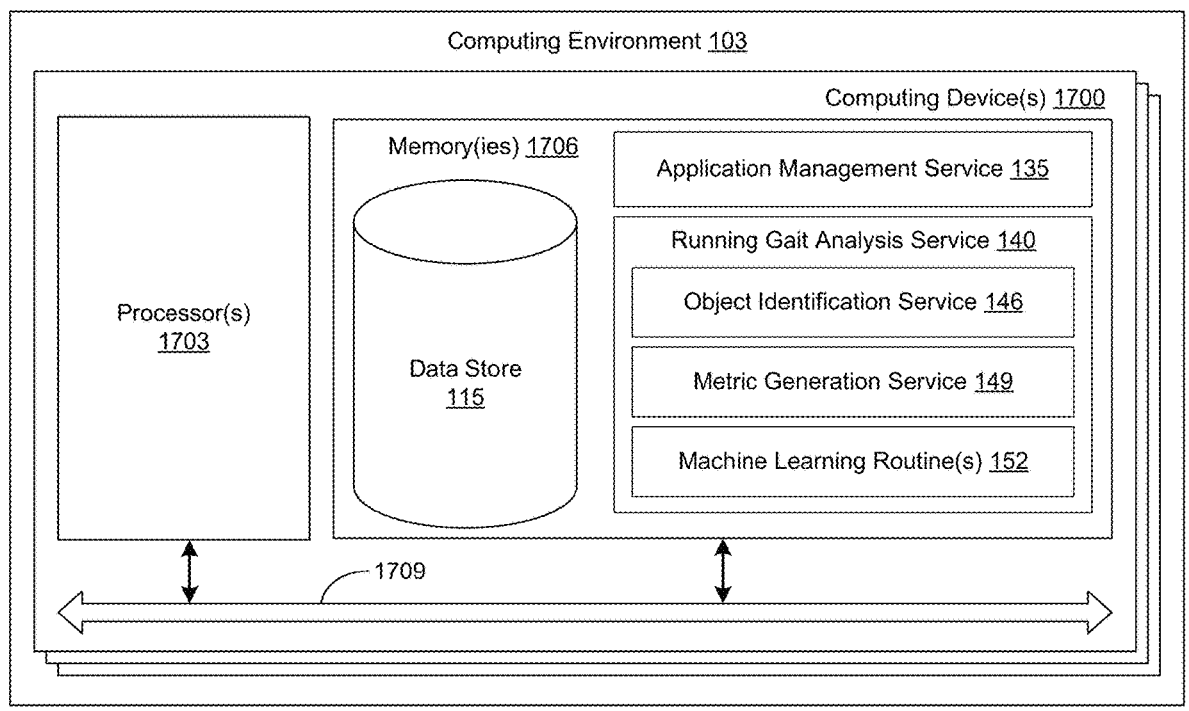
FIG. 17 is a schematic block diagram that provides one example illustration of a computing environment employed in the networked environment of FIG. 1 according to various embodiments of the present disclosure.

With reference to FIG. 17, shown is a schematic block diagram of the computing environment 103 according to an embodiment of the present disclosure. The computing environment 103 includes one or more computing devices 1700. Each computing device 1700 includes at least one processor circuit, for example, having a processor 1703 and a memory 1706, both of which are coupled to a local interface 1709. To this end, each computing device 1700 may comprise, for example, at least one server computer or like device. The local interface 1709 may comprise, for example, a data bus with an accompanying address/control bus or other bus structure as can be appreciated.

Stored in the memory 1706 are both data and several components that are executable by the processor 1703. In particular, stored in the memory 1706 and executable by the processor 1703 are the application management service 135, the running gait analysis service 140, the object identification service 146, the metric generation service 149, the machine learning routines 152, and potentially other applications. Also stored in the memory 1706 may be a data store 115 and other data. In addition, an operating system may be stored in the memory 1706 and executable by the processor 1703.

It is understood that there may be other applications that are stored in the memory 1706 and are executable by the processor 1703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, TypeScript, Dart®, or other programming languages.

A number of software components are stored in the memory 1706 and are executable by the processor 1703. In this respect, the term "executable" means a program file that is in a form that can ultimately be run by the processor 1703. Examples of executable programs may be, for example, a compiled program that can be translated into machine code in a format that can be loaded into a random access portion of the memory 1706 and run by the processor 1703, source code that may be expressed in proper format such as object code that is capable of being loaded into a random access portion of the memory 1706 and executed by the processor 1703, or source code that may be interpreted by another executable program to generate instructions in a random access portion of the memory 1706 to be executed by the processor 1703, etc. An executable program may be stored in any portion or component of the memory 1706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1706 is defined herein as including both volatile and nonvolatile memory and data storage components. Volatile components are those that do not retain data values upon loss of power. Nonvolatile components are those that retain data upon a loss of power. Thus, the memory 1706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1703 may represent multiple processors 1703 and/or multiple processor cores and the memory 1706 may represent multiple memories 1706 that operate in parallel processing circuits, respectively. In such a case, the local interface 1709 may be an appropriate network that facilitates communication between any two of the multiple processors 1703, between any processor 1703 and any of the memories 1706, or between any two of the memories 1706, etc. The local interface 1709 may comprise additional systems designed to coordinate this communication, including, for example, performing load balancing. The processor 1703 may be of electrical or of some other available construction.

Although the application management service 135, the running gait analysis service 140, the object identification service 146, the metric generation service 149, the machine learning routines 152, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 16 show the functionality and operation of an implementation of portions of the client device 106 and/or the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1703 in a computer system or other system. The machine code may be converted from the source code, etc. If embodied in hardware, each block may represent a circuit or a number of interconnected circuits to implement the specified logical function(s).

Although the flowcharts of FIGS. 2 and 16 show a specific order of execution, it is understood that the order of execution may differ from that which is depicted. For example, the order of execution of two or more blocks may be scrambled relative to the order shown. Also, two or more blocks shown in succession in FIGS. 2 and 16 may be executed concurrently or with partial concurrence. Further, in some embodiments, one or more of the blocks shown in FIGS. 2 and 16 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application management service 135, the running gait analysis service 140, the object identification service 146, the metric generation service 149, and the machine learning routines 152, that comprises software or code can be embodied in any non-transitory computer-readable medium for use by or in connection with an instruction execution system such as, for example, a processor 1703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the application management service 135, the running gait analysis service 140, the object identification service 146, the metric generation service 149, and the machine learning routines 152, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1700, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method for implementing machine learning to generate a suggestion for improving running gait, comprising:
   accessing, by at least one computing device, video data from at least one video frame captured by at least one imaging device;
   executing, by the at least one computing device, at least one machine learning routine using the video data to generate positional data of anatomical landmarks of a human or bipedal non-human subject in the at least one video frame;
   generating, by the at least one computing device, at least one of a gait metric and a gait characteristic for at least one stage of a gait cycle based at least in part on the positional data;
   determining, by the at least one computing device, at least one of an optimal gait cycle for a given body part or gait metric of the subject that may be adjusted for velocity of the subject or at least one demographic or environmental covariable;
   determining, by the at least one computing device, a difference and a similarity between the gait cycle of the subject and the optimal gait cycle as a function of gait cycle completion and at each of the at least one stage of the gait cycle of the subject;
   generating, by the at least one computing device, a suggested change to movement patterns of the subject at specific timepoints and stages of the gait cycle that minimize the difference between the gait cycle of the subject and the optimal gait cycle; and
   causing, by the at least one computing device, the suggested change to the movement patterns to be shown on a display device.

2. The computer-implemented method in claim 1, wherein:
   the at least one machine learning routine is a plurality of machine learning routines;
   executing the at least one machine learning routine using the video data to generate the positional data of the anatomical landmarks of the human or bipedal non-human subject in the video data comprises:
     executing a first one of the plurality of machine learning routines is used to detect the subject within at least one frame of the video and create at least one bounding box containing the at least one human and/or bipedal non-human subject; and
     executing a second one of the plurality of machine learning routines using areas of the at least one frame of the video within the at least one bounding box to obtain coordinates of anatomical landmarks and joint angle measurements.

3. The computer-implemented method in claim 1, further comprising:
   identifying, by the at least one computing device, a gait metric or movement pattern that can be improved, or at least one specific muscle, tendon, ligament, or joint that is at risk for injury; and
   causing, by the at least one computing device, at least one of a specific strength, myofascial release, or flexibility exercise for gait retraining, or a suggested change to gait mechanics to be shown on the display device.

4. The computer-implemented method in claim 3, wherein:
   the least one stage of a gait cycle comprises a strike stage, a stance stage, or a swing stage; and
   the at least one environmental covariable is one of a goal speed, a goal distance, age, gender, height, weight, limb length, truncal length, and fatigue; and
   wherein at least one candidate target identified for improvement comprises a weak or imbalanced muscle or group of muscles or a motion-restricted joint.

5. The computer-implemented method of claim 1, further comprising applying, by the at least one computing device, at least one of digital signal processing, parametric statistical analysis, and non-parametric statistical analysis to the positional data of the anatomical landmarks to determine the gait metric or the gait characteristic.

6. The computer-implemented method of claim 1, wherein:
   the at least one machine learning routine is a first one of a plurality of machine learning routines; and
   the computer-implemented method further comprises executing, by the at least one computing device, a second one of the plurality of machine learning routines using the positional data of the anatomical landmarks to determine the gait metric or the gait characteristic.

7. The computer-implemented method of claim 1, wherein the gait metric or the gait characteristic is selected from a group consisting of: a symmetry measurement, a coordination measurement, a range of motion measurement, a stride length, a cadence, a pelvic tilt, a vertical oscillation, a head tilt, a hip tilt, a stride angle, a forward lean, a backward lean, a postural sway, a foot placement at foot strike, a foot placement at foot push off, a femur rotation amount and velocities, a knee valgus, a knee varus, a foot pronation, a foot supination, an estimated ground impact force, a forefoot strike, a midfoot strike, a heel strike, a gait economy, and any combination thereof.

8. The computer-implemented method of claim 1, wherein the gait cycle is determined by at least one computing device using peak detection.

9. The computer-implemented method of claim 2, wherein the coordinates of the anatomical landmarks and the joint angle measurements are two-dimensional or three-dimensional.

10. The computer-implemented method in claim 1, wherein the suggested change comprises a suggestion associated with footwear, muscle group activation, or visualization of running form.

11. A system for implementing machine learning to generate a suggestion for improving running gait, comprising:
    at least one computing device comprising at least one hardware processor;
    program instructions stored in memory and executable by the at least one computing device that, when executed, direct the at least one computing device to:
      access video data from at least one video frame captured by at least one imaging device;
      execute at least one machine learning routine using the video data to generate positional data of anatomical landmarks of a human or bipedal non-human subject in the at least one video frame;
      generate at least one of a gait metric and a gait characteristic for at least one stage of a gait cycle based at least in part on the positional data;
      determine at least one of an optimal gait cycle for a given body part or gait metric of the subject that may be adjusted for the velocity of the subject or at least one demographic or environmental covariable;

determine a difference and a similarity between the gait cycle of the subject and the optimal gait cycle as a function of gait cycle completion and at each of the at least one stage of the gait cycle of the subject;

generate a suggested change to movement patterns of the subject at specific timepoints and stages of the gait cycle that minimize the difference between the gait cycle of the subject and the optimal gait cycle; and cause the suggested change to the movement patterns to be shown on a display device.

12. The system of claim 11, wherein:

the at least one machine learning routine is a plurality of machine learning routines;

executing the at least one machine learning routine using the video data to generate the positional data of the anatomical landmarks of the human or bipedal non-human subject in the video comprises:

executing a first one of the plurality of machine learning routines is used to detect the subject within at least one frame of the video and create at least one bounding box containing at least one human and/or bipedal non-human subject; and executing a second one of the plurality of machine learning routines using areas of the at least one frame of the video within the at least one bounding box to obtain coordinates of anatomical landmarks and joint angle measurements.

13. The system of claim 11, wherein the at least one computing device is further directed to:

identify a gait metric or movement pattern that can be improved, or at least one specific muscle, tendon, ligament, or joint that is at risk for injury; and cause at least one of a specific strength, myofascial release, or flexibility exercise for gait retraining, or a suggested change to gait mechanics to be shown on the display device.

14. The system of claim 11, wherein:

the least one stage of a gait cycle comprises a strike stage, a stance stage, or a swing stage; and the at least one environmental covariable is one of a goal speed, a goal distance, age, gender, height, weight, limb length, truncal length, and fatigue; and wherein at least one candidate target identified for improvement comprises a weak or imbalanced muscle or group of muscles or a motion-restricted joint.

15. The system of claim 11, wherein the at least one computing device is further directed to:

perform at least one of digital signal processing, parametric statistical analysis, and non-parametric statistical analysis to the positional data of the anatomical landmarks to determine the gait metric or the gait characteristic.

16. The system of claim 11, wherein:

the at least one machine learning routine is a first one of a plurality of machine learning routines; and the at least one computing device is further directed to execute a second one of the plurality of machine learning routines using the positional data of the anatomical landmarks to determine the gait metric or the gait characteristic.

17. The system of claim 11, wherein the gait metric or the gait characteristic is selected from a group consisting of: a symmetry measurement, a coordination measurement, a range of motion measurement, a stride length, a cadence, a pelvic tilt, a vertical oscillation, a head tilt, a hip tilt, a stride angle, a forward lean, a backward lean, a postural sway, a foot placement at foot strike, a foot placement at foot push off, a femur rotation amount and velocities, a knee valgus, a knee varus, a foot pronation, a foot supination, an estimated ground impact force, a forefoot strike, a midfoot strike, a heel strike, a gait economy, and any combination thereof.

18. The system of claim 11, wherein the gait cycle is determined by at least one computing device using peak detection.

19. The system of claim 11, wherein the coordinates of the anatomical landmarks and the joint angle measurements are two-dimensional or three-dimensional.

20. The system of claim 11, wherein the suggested change comprises a suggestion associated with footwear, muscle group activation, or visualization of running form.

* * * * *